United States Patent
Yanagihara

(10) Patent No.: US 8,973,154 B2
(45) Date of Patent: Mar. 3, 2015

(54) AUTHENTICATION USING TRANSIENT EVENT DATA

(76) Inventor: Kazu Yanagihara, Cupertino, CA (US)

( * ) Notice: Subject to any disclaimer, the term of this patent is extended or adjusted under 35 U.S.C. 154(b) by 1013 days.

(21) Appl. No.: 12/699,027

(22) Filed: Feb. 2, 2010

(65) Prior Publication Data

US 2011/0191838 A1 Aug. 4, 2011

(51) Int. Cl.
| | |
|---|---|
| G06F 7/04 | (2006.01) |
| H04L 9/32 | (2006.01) |
| G06F 15/16 | (2006.01) |
| G06F 21/00 | (2013.01) |
| H04L 29/06 | (2006.01) |

(52) U.S. Cl.
CPC ............... *H04L 9/321* (2013.01); *G06F 15/16* (2013.01); *G06F 21/00* (2013.01); *G06F 2221/2143* (2013.01); *H04L 63/308* (2013.01)
USPC ............................................. 726/28; 726/35

(58) Field of Classification Search
CPC ....... G06F 21/00; G06F 21/10; G06F 21/128; G06F 21/30; G06F 21/305; G06F 21/31; G06F 21/33; G06F 21/60; G06F 21/6245; G06F 21/88; G06F 2221/2103; G06F 2221/2115; G06F 2221/2133; G06F 2221/2143; H04L 9/32; H04L 9/321; H04L 63/08; H04L 63/083; H04L 63/10; H04L 63/105; H04L 63/30; H04L 63/308
USPC ................. 726/2–5, 7, 16–17, 19, 21, 26–28, 726/34–35; 713/182–184; 380/247
See application file for complete search history.

(56) References Cited

U.S. PATENT DOCUMENTS

| | | | | |
|---|---|---|---|---|
| 5,942,947 | A * | 8/1999 | Bhagwan | 331/8 |
| 6,775,782 | B1 * | 8/2004 | Buros et al. | 726/2 |
| 7,174,454 | B2 | 2/2007 | Roskind | |
| 7,512,806 | B2 * | 3/2009 | Lemke | 713/186 |
| 7,538,674 | B2 * | 5/2009 | Garfinkle | 340/572.1 |
| 7,895,662 | B1 * | 2/2011 | Scales et al. | 726/27 |
| 8,254,884 | B2 * | 8/2012 | Kahandaliyanage | 455/410 |
| 8,392,975 | B1 * | 3/2013 | Raghunath | 726/7 |
| 2003/0051164 | A1 * | 3/2003 | Patton | 713/201 |
| 2003/0154406 | A1 * | 8/2003 | Honarvar et al. | 713/201 |
| 2004/0030934 | A1 * | 2/2004 | Mizoguchi et al. | 713/202 |
| 2004/0230843 | A1 * | 11/2004 | Jansen | 713/202 |
| 2007/0239730 | A1 | 10/2007 | Vigelette et al. | |
| 2007/0271601 | A1 | 11/2007 | Pomerantz | |
| 2007/0277224 | A1 * | 11/2007 | Osborn et al. | 726/2 |
| 2008/0046997 | A1 * | 2/2008 | Wang | 726/16 |
| 2008/0134317 | A1 * | 6/2008 | Boss et al. | 726/18 |

(Continued)

*Primary Examiner* — Saleh Najjar
*Assistant Examiner* — Eric W Shepperd
(74) *Attorney, Agent, or Firm* — Womble Carlyle Sandridge & Rice LLP

(57) ABSTRACT

Some embodiments provide a method for authenticating a user to access computing resources that uses transient event data regarding previous interactions of the user with the computing resources. The method receives a notification that a user is unable to provide a correct user identifier and password. The method generates authentication questions for the remote user using the transient event data. The authentication questions are presented to the user. The method authenticates the user based on answers to the password recovery questions. The user may be a remote user and the computing resources are a set of application servers to which the user has forgotten a password. The computing resources may be a portable device that the user wishes to access remotely in order to delete data from the portable device.

26 Claims, 14 Drawing Sheets

(56) References Cited

U.S. PATENT DOCUMENTS

| | | | |
|---|---|---|---|
| 2009/0075630 A1* | 3/2009 | McLean | 455/411 |
| 2009/0109180 A1* | 4/2009 | Do et al. | 345/173 |
| 2010/0043062 A1* | 2/2010 | Alexander et al. | 726/6 |
| 2010/0115092 A1* | 5/2010 | Westin | 709/224 |
| 2010/0122340 A1* | 5/2010 | Chow et al. | 726/18 |
| 2010/0122341 A1* | 5/2010 | Golle et al. | 726/21 |
| 2011/0145927 A1* | 6/2011 | Hubner et al. | 726/26 |
| 2011/0191838 A1* | 8/2011 | Yanagihara | 726/7 |
| 2011/0215921 A1* | 9/2011 | Ben Ayed et al. | 340/539.11 |
| 2012/0210119 A1* | 8/2012 | Baxter et al. | 713/150 |
| 2012/0240208 A1* | 9/2012 | Kokubo | 726/7 |

\* cited by examiner

1000

1. Which of the following programs did you use during your last login? 1005

A: Safari ○
B: Keynote ●
C: Pages ○
D: iMovie ○

2. To which of the following people did you most recently send an e-mail? 1010

A: Ryan ●
B: Jason ○
C: Will ○
D: Janet ○

3. Which of these documents were you most recently editing? 1015

A: Figures.vsd ○
B: Patent.doc ○
C: Claims.doc ●
D: Appeal.docx ○

4. Which of the following is the subject of your most recently sent e-mail? 1020

A: Draft Application ○
B: Joshua Tree ● 1035
C: Saturday ○
D: patent question ○

5. Which of the following websites did you view during your last login? 1025

A: www.uspto.gov ○
B: www.apple.com ○
C: www.adelitollen.com ○
D: www.espn.com ○

6. Which of the following screen savers does your computer use? 1030

A: 3D Pipes ○
B: Slideshow ○
C: 3D Text ○
D: Starfield ○

Submit Answers 1040

*Figure 10*

AUTHENTICATION USING TRANSIENT EVENT DATA

BACKGROUND

In today's electronic world, people are expected to remember dozens of passwords in order to access various electronic media (web sites, devices, servers, applications, etc.). The tendency of people to forget these passwords, especially those that are used less often, has led to the notion of password recovery.

Password recovery is used most often for websites (e.g., credit card or bank account logins, social networking sites, etc.), but is applicable to any user account with a password. The standard information used for password recovery is data provided up-front by the user. Common examples include the user's mother's maiden name, city of birth, first pet, first job, favorite sports team, etc. Generally, one or more questions based on this data are asked of the user, and the user is given a new password upon correctly answering the questions.

However, the information collected for password recovery is often the same from website to website. Therefore, if an unauthorized person gains access to a user's account on one website, that person can often access the user's account on other sites. Furthermore, much of the information used for password recovery is not all that secret, especially in the age of social networking. It is not unlikely that information about a user's pets, jobs, sports teams, etc. would be available on a Facebook® page.

BRIEF SUMMARY

Some embodiments of the invention provide a novel method that uses transient event data to generate questions for authenticating a user to access computing resources. Different embodiments are used to generate questions based on transient event data for different computing resources. Examples of such computing resources a device (e.g., a personal computer, smartphone, etc.), a server or servers, a web application or account, etc.

In some embodiments, the transient event data that is used to generate the authentication questions is information drawn from the user's previous interactions with the computing resource. This information varies depending on the computing resource that the user desires to access. For example, when the computing resource is a device, the transient event data may include the user's settings on the device (e.g., screensaver, desktop image, etc.), applications recently used on the device, documents recently opened, etc. When the computing resource is a website, the transient event data may include recent login history for the user, transaction data from the user's interactions with the website, etc. Other types of computing resources will use different transient event data.

In some embodiments, the authentication process using transient event data begins when a user indicates that he wishes to access the computing resource but does not have a password (e.g., the user has forgotten his password or never set up a password). Questions that only the user should be able to answer are then generated using the transient event data relating to the user's interaction with the computing resources and presented to the user through a user interface (e.g., a graphical user interface, a text-based interface such as Short Message Service (SMS) or a command prompt, etc.). If the computing resource the user wishes to access is remote, then the questions are transmitted over a network (e.g., a local area network, wireless network, network of networks, etc.). When the user is able to answer enough of the questions correctly, the user is provided access to the computing resource.

As mentioned, the transient event data may be used in a variety of situations. For instance, a locked device such as a smartphone or personal computer may ask a user questions based on transient event data in order to grant the user access. In a specific application, a user may want to wipe data from a portable device that has been lost or stolen. Some embodiments enable a user to find the portable device via a network (e.g., the Internet), and then allow the user to initiate a data wipe application on the device only after answering questions based on transient event data.

As another example, some embodiments use transient event data-based questions to provide access to a system with multiple application servers that are all accessed with one user identifier and password. In some embodiments, such a system also includes one or more databases storing transient event data for the application servers (e.g., one database for each server). The system of some embodiments also includes one or more back-end modules (e.g., running on a directory server) that perform authentication operations. The authentication operations of some embodiments include verifying password/user ID combinations, generating questions based on the transient event data, and verifying the answers to those questions.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 10 illustrates a GUI of some embodiments used when all password recovery questions are presented to the user at once.

DETAILED DESCRIPTION

In the following description, numerous details are set forth for purpose of explanation. However, one of ordinary skill in the art will realize that the invention may be practiced without the use of these specific details. For instance, some of the examples illustrate specific uses of transient event data. One of ordinary skill in the art will recognize that access to any number of possible computing resources could be authenticated using transient event data.

Some embodiments of the invention provide a novel method that uses transient event data to generate questions for authenticating a user to access computing resources. Different embodiments are used to generate questions based on transient event data for different computing resources. Examples of such computing resources a device (e.g., a personal computer, smartphone, etc.), a server or servers, a web application or account, etc.

Figure 1:
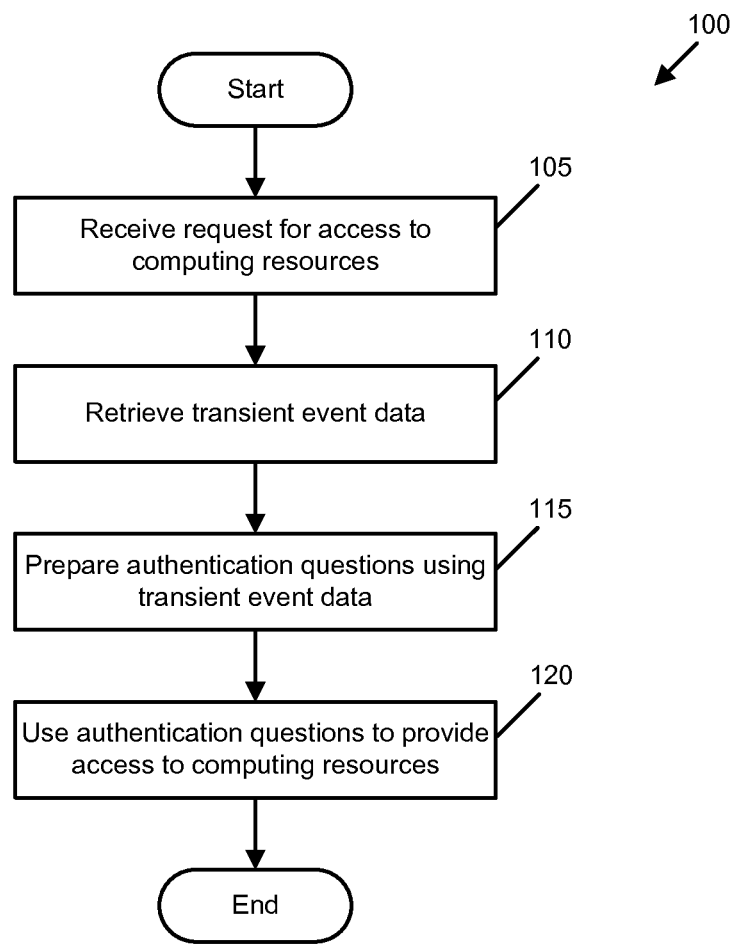
FIG. 1 conceptually illustrates a process of some embodiments for providing access to computing resources by using transient event data.

FIG. 1 conceptually illustrates a process 100 of some embodiments for providing access to computing resources by using transient event data. As shown, the process begins by receiving (at 105) a request for access to computing resources for a particular user. The computing resources may be any of the different types of resources mentioned in the above paragraph as well as any other type of resources. In some embodiments, the request may be received as an indication that the particular user has forgotten a password for accessing the computing resources.

The process then retrieves (at 110) transient event data. The transient event data in some embodiments is information drawn from the particular user's previous interactions with the computing resource. This information will vary depending on the computing resource that the user desires to access. For instance, when the computing resource is a device, the transient event data may include the user's settings on the device (e.g., screensaver, desktop image, etc.), applications recently used on the device, documents recently opened, etc. When the computing resource is a website, the transient event data may include recent login history for the user, transaction data from the user's interactions with the website, etc. Other types of computing resources will use different transient event data.

In different embodiments, the process retrieves the transient event data from different locations. For instance, when the process is running on the device that the user is attempting to access, the transient event data is often stored on a storage of the device. As another example, when a user is attempting to access an application server or set of application servers, the process of some embodiments runs on a directory server and the transient event data is retrieved from databases associated with the different application servers.

Next, the process prepares (at 115) authentication questions using the retrieved transient event data. These are questions relating to the user's interaction with the computing resources that only the user should be able to answer. In different embodiments, different types of questions are asked. Some embodiments use multiple choice questions with one answer, multiple choice questions with multiple answers, questions for which the user must type in an answer, and/or other types of questions.

Finally, the process uses (at 120) the authentication questions to provide access to the computing resources. In some embodiments, the questions are presented to the user via a user interface (e.g., a graphical user interface, text-based interface such as SMS or a command prompt, etc.). The user then answers the questions through the user interface (e.g., selecting an answer in a graphical user interface, typing an answer in an SMS message and sending the message, etc.). The process provides access to the computing resources if enough of the questions are answered correctly, and denies access if not enough of the questions are answered correctly.

Processes using transient event data to develop authentication questions may be used in a variety of different situations. A locked device such as a smartphone or personal computer may ask questions of a user that has forgotten his password to the device. In one specific application, a user may want to wipe data from a portable device that has been lost or stolen. Some embodiments enable a user to find a portable device that has been lost or stolen via a network (e.g., the Internet), and then allow the user to initiate a data wipe application on the portable device after answering questions based on the transient event data.

As another example, some embodiments use questions based on transient event data to authenticate a user of a system that has one or more application servers all accessed with a single user identifier and password. The system may be accessed via a network (such as a local network or the Internet) and may provide multiple functions to the user. Such a system, in some embodiments, includes databases storing transient event data for the one or more application servers in addition to background modules (e.g., running on or in conjunction with a directory server) that perform authentication operations. In some embodiments, these background modules check passwords and user identifiers, generate authentication questions using transient event data, and check the answers to such questions.

Several more detailed embodiments of the invention are described below. Section I describes in further detail the user of transient event data for password recovery and other authentication processes, and provides several detailed examples of specific applications. Section II describes a graphical user interface (GUI) of some embodiments and provides further detail on specific types of questions and answers that may be generated using transient event data. Finally, Section III describes an electronic system with which some embodiments of the invention are implemented.

I. Use of Transient Event Data for Authentication

As described above, some embodiments use transient event data to generate authentication questions and answers. In some embodiments, the authentication questions are used for password recovery when a user has forgotten his password. The password allows a user access to a device, application, server, website, etc. in some embodiments. In some embodiments, the authentication questions are used when a user does not have an appropriate digital certificate or other validation measure. The transient event data, in some embodiments, is related to the user's activity with the device, application, server, website, etc. that the user wishes to access. This transient event data, depending on what type of computing resources the user is attempting to access, may be data relating to applications the user has recently used, people with whom the user has recently interacted (e.g., via chat, e-mail, etc.), documents the user has recently opened, etc.

The following provides several examples of the use of such transient event data for password recovery. One of ordinary skill in the art will understand that transient event data can be used in many other situations (e.g., website access) than are shown in these examples.

A. Accessing a Locked Device

In some embodiments, transient event data regarding a user's interactions with a device (e.g., a computer) is used for password recovery when the device is locked and the user is unable to remember the password. A personal computer, for instance, is often locked at startup time, as well as when a screensaver on the computer has been activated. When a user of the computer has forgotten his password, some embodiments present the user with password recovery questions based on the user's recent use of the computer. This can include use of various applications on the computer, system preferences and settings, etc.

Figure 2:
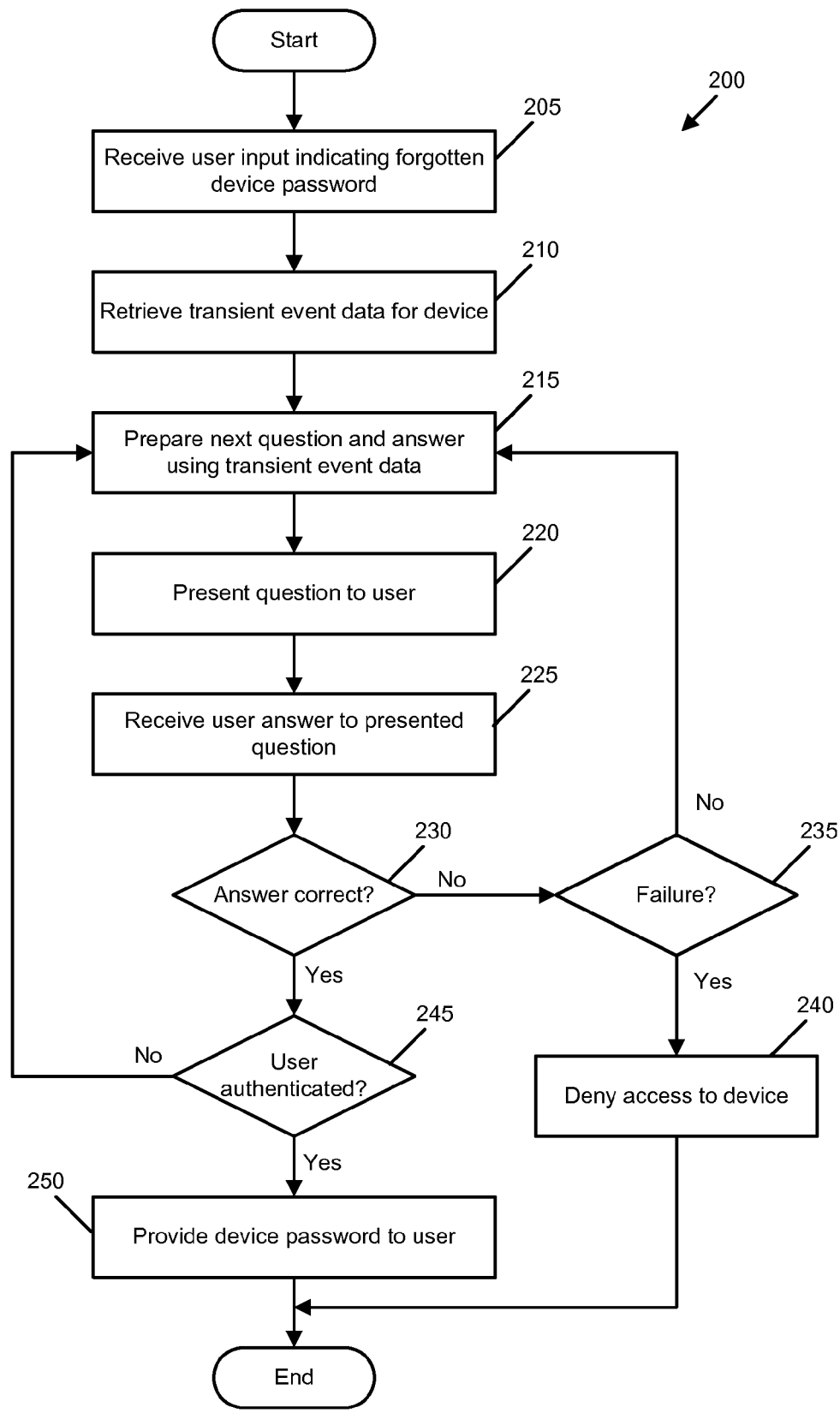
FIG. 2 conceptually illustrates a first process of some embodiments for validating a user of a device that has forgotten his password to the device.

FIG. 2 conceptually illustrates a process 200 of some embodiments for validating a user of a device that has forgotten his password to the device. In some embodiments, process 200 is performed by an operating system of the device. In other embodiments, a password recovery application separate from the operating system performs process 200.

As shown, the process begins by receiving (at 205) user input indicating that the user has forgotten his password for accessing the device. For instance, when the device is a personal computer, this password is for logging on to the operating system of the device. The device could also be a phone or similar portable device, in which case the password might be for unlocking the device after a period of nonuse (e.g., 15 seconds, 1 minute, 15 minutes, etc.). The user interacts with the user interface (e.g., via a touchscreen, using a mouse and/or keyboard, etc.) in order to indicate to the device that the user has forgotten her password. When the device receives the indication of the forgotten password, the password recovery process is initiated.

Process 200 retrieves (at 210) transient event data for the device. In some embodiments, a data storage for transient event data is regularly (e.g., constantly, every hour, every day, etc.) updated with the most recent user interactions. Some embodiments also collect data from other data storages upon the initiation of the password recovery process.

The transient event data for a device may include a wide variety of data. For example, the data may relate to logon and logoff times and/or logon frequency for the user, documents accessed by the user, the current desktop image of the user, the current screensaver, other devices recently connected to the device (e.g., phones, MP3 players, recorders, microphones, joysticks, etc.), applications recently run by the user (e.g., e-mail applications, web browsers, games, office applications, etc.) and data generated by the use of those applications (e.g., websites accessed, people e-mailed, achievements in games, etc.), as well as a multitude of other data.

Using the retrieved transient event data, the process then prepares (at 215) a question for the user to answer. The question may be based off of any of the transient event data in some embodiments. For instance, some embodiments have preferred questions (e.g., "Which of the twenty presented images is your desktop image"), and go through these questions in a particular order. Other embodiments weight various questions based on preference and also weight the data for the questions based on how current the data is. That is, data generated within the twenty-four hours prior to the password recovery might be weighted more strongly than data generated a week prior. Some embodiments select questions randomly from a pool of questions. In some such embodiments, the questions are weighted but chosen randomly (e.g., using a random selection in which a first question is twice as likely to be selected as another question). Some embodiments will not choose a question that has been asked during a password recovery operation within a threshold time period (e.g., the last three days).

The questions chosen may also vary based on policies appropriate for the use scenario. For instance, if the device is for use in an elementary school classroom, the questions may be designed to be easier than if the device is for use in a corporate or government setting. As such, the questions in the former case may be easier and more geared towards simple multiple choice than in the latter case. In the government or corporate setting, questions requiring the user to type an answer might be more likely.

Of course, if there is no data to supply a particular question with an answer, the process will not choose that particular question. For instance, if a user only uses the device for web browsing and e-mail, then a question regarding the most recent documents opened on the device will not have an answer. Similarly, if the device is not connected to the internet, then there is no answer to a question regarding recent web sites visited.

As noted, an answer to the question must also be prepared. In different embodiments the questions may be different combinations of multiple choice questions with a single answer, multiple choice questions with multiple answers, questions to which the user must type in an answer, or other sorts of questions. In some embodiments, multiple questions are presented to a user, and may include different types of questions. Section II describes in more detail the various types of questions that a password recovery application may ask a user.

Once the question is prepared, the process presents (at 220) the question to the user. In some embodiments, the password recovery question is presented via a graphical user interface (GUI) through which a user provides an answer. When the password recovery application is separate from the operating system, the application generates the GUI which one or more modules in the operating system send to a display device (i.e., the modules for interfacing with the particular display device).

Process 200 then receives (at 225) an answer from the user to the presented question. In some embodiments, a user either types (e.g., with a keyboard, touchscreen, etc.) or selects (e.g., with a mouse or similar cursor controller, a touchscreen, etc.) an answer. This answer is then sent to the password recovery application or module for verification as to whether the answer is correct.

The process next determines (at 230) whether the answer provided by the user is correct. When the question is multiple choice, this is a simple determination as to whether the user has selected the correct answer or answers. However, when answering the question involves typing in an answer, more than a simple comparison may be needed. For one thing, multiple different answers might be correct and the process would need to check the entered answer against the entire set of possible correct answers (e.g., if the question asks for an application that was used during the user's previous logon). Furthermore, the answer might have misspellings, and some embodiments accept answers that are within one or two letters of the properly typed, correct answer. In some cases, when the answer calls for a person's name (e.g., if the question asks for a contact with whom the user has recently chatted), either the first and last names or just the first name may be entered.

When the answer provided by the user is incorrect, the process determines (at 235) whether the user has failed to authenticate. Some embodiments allow one or more incorrect answers before denying access to the device. For instance, some embodiments only require the user to correctly answer six out of seven questions correctly, or a similar ratio that serves the dual purposes of (i) being difficult enough that an invalid user cannot randomly guess and gain access to the device while (ii) enabling a valid user to actually access the device. When the user has not yet failed to authenticate, the process returns to 215 to prepare the next question and answer. In some embodiments, this will be the same question, giving the user another chance to answer correctly. Of course, this is more likely the case when the question is not multiple choice. When a user answers a question incorrectly, some embodiments also display a message to the user to indicate that the answer is wrong. Other embodiments, however, do not display such a message.

When the process determines that the user has failed to authenticate, the process denies (at 240) access to the device. In some embodiments, this includes displaying a message to the user that the user has failed to properly authenticate. Some embodiments also prevent any further password recovery attempts within a predefined time period (e.g., 15 minutes, one hour, twenty four hours, etc.). Some embodiments keep track of recent password recovery attempts and allow a particular number within a predefined time period (e.g., three per hour, five per day, etc.). After denying access to the device, the process ends.

When the user answers a question correctly (as determined by operation 230), process 200 next determines (at 245) whether the user is fully authenticated. As mentioned above, some embodiments ask a series of questions, so one correct answer is not necessarily enough to authenticate the user. When the user is not yet authenticated, the process returns to 215 to prepare the next question and answer. When the user has answered enough questions correctly to be authenticated, the process provides (at 250) the device password to the user. In some embodiments, this is a new temporary password that allows the user to log into the device and then reset the password. In other embodiments, the user is directly presented with the opportunity to choose a new password. Some embodiments, though, provide the user with his previous password. Some embodiments automatically log in to the device while providing the password (either new or old) to the user.

Figure 3:
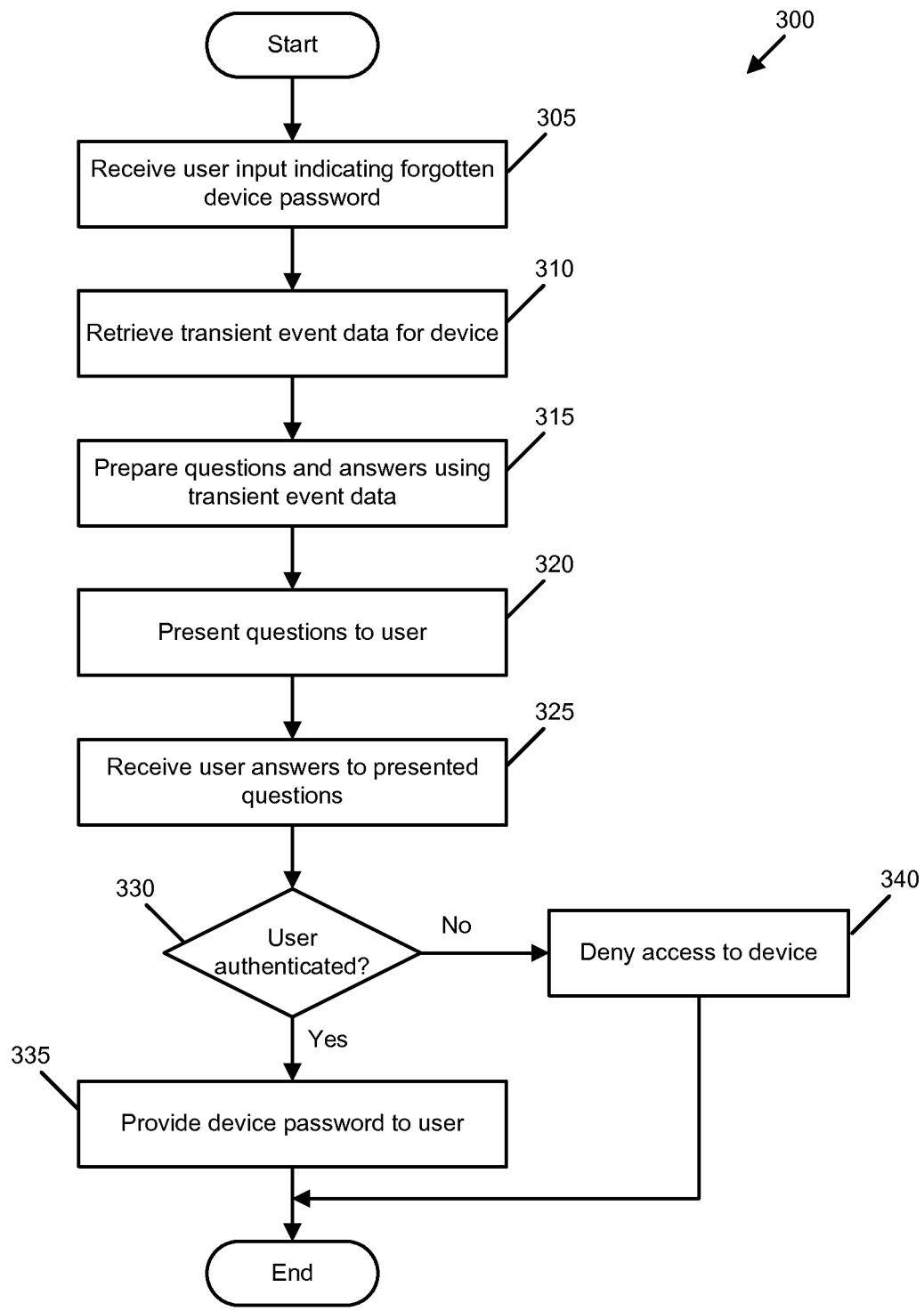
FIG. 3 conceptually illustrates a second process of some embodiments for validating a user of a device that has forgotten his password to the device.

FIG. 3 conceptually illustrates a process 300 of some embodiments that is also for validating a user of a device that has forgotten his password to the device. Process 300 is similar in many ways to process 200, but rather than asking questions to the user one at a time, process 300 presents the user with all of the questions at once. As with process 200, process 300 is performed by an operating system of the device in some embodiments. In other embodiments, a password recovery application separate from the operating system performs process 300.

As shown, process 300 begins in the same way as process 200. Operations 305 and 310 are the same as described above for operations 205 and 210. At these operations, process 300 receives user input indicating that the user has forgotten his password for the device and then retrieves transient event data for the device.

Using the retrieved transient event data, the process then prepares (at 315) a set of questions for the user to answer. As described above, some embodiments base the questions off of any of the transient event data. Some embodiments have a preferred set of questions and begin at the top of this preferred order when selecting questions. Other embodiments weight the questions and also weight how current the data is. Yet other embodiments randomly choose questions from a pool. In some such embodiments, the questions are weighted but chosen randomly (e.g., using a random selection in which a first question is twice as likely to be selected as another question). Some embodiments will not choose a question that has been asked during a password recovery operation within a threshold time period (e.g., the last three days).

The questions chosen may also vary based on policies appropriate for the use scenario. For instance, if the device is for use in an elementary school classroom, the questions may be designed to be easier than if the device is for use in a corporate or government setting. As such, the questions in the former case may be easier and more geared towards simple multiple choice than in the latter case. In the government or corporate setting, questions requiring the user to type an answer might be more likely.

As noted above, the process can only choose a question when an answer exists for the question. For instance, if a user only uses the device for web browsing and e-mail, then a question regarding the most recent documents opened on the device will not have an answer. Similarly, if the device is not connected to the internet, then there is no answer to a question regarding recent web sites visited.

As described with respect to process 200, answers to the questions must also be prepared. As mentioned, the questions may be different combinations of multiple choice questions with a single answer, multiple choice questions with multiple answers, questions to which the user must type in an answer, or other sorts of questions. Section II describes in more detail the various types of questions that a password recovery application may ask a user.

Once the questions and answers are prepared, the process presents (at 320) the questions to the user. In some embodiments, the password recovery questions are presented via a graphical user interface (GUI) through which a user provides answers. When the password recovery application is separate from the operating system, the application generates the GUI. The GUI is sent to one or more modules in the operating system (i.e., the modules for interfacing with the particular display device), which in turn send the GUI to a display device. Examples of such a user interface are shown and described below in Section II.

Process 300 then receives (at 325) answers from the user to the presented questions. In some embodiments, a user either types (e.g., with a keyboard, touchscreen, etc.) or selects (e.g., with a mouse or similar cursor controller, a touchscreen, etc.) the answers. As some embodiments present the user with a variety of different types of questions, the user may type in some of the answers and select other answers before submitting the answers (e.g., by selecting an answer submission button). These answers are then sent to the password recovery application or module for verification as to whether the answer is correct.

The process determines (at 330) whether the user is authenticated. In some embodiments, this involves determining whether each of the questions is answered correctly and then whether the user has answered enough of the questions correctly. For multiple choice questions, determining whether the question is answered correctly is fairly simple. However, when the question is answered via a typed answer, the process must account for multiple possible answers, spellings, shortened answers, etc., as described above with respect to process 200.

When a user has answered all of the questions correctly, the user will be authenticated. Similarly, if all of the answers are wrong, then the user will not be authenticated. Some embodiments will authenticate a user even if one or two questions are answered incorrectly (e.g., a user must answer six of seven questions correctly, or a similar ratio). When the user answers enough of the questions correctly to be authenticated, the process provides (at 335) the device password to the user. In some embodiments, this is a new temporary password that allows the user to log into the device and then reset the password. In other embodiments, the user is directly presented with the opportunity to choose a new password. Some embodiments, though, provide the user with his previous password. Some embodiments automatically log in to the device while providing the password (either new or old) to the user.

When the process determines that the user has failed to authenticate because too many of the answers are incorrect, the process denies (at 340) access to the device. In some embodiments, this includes displaying a message to the user that the user has failed to properly authenticate. Some embodiments also prevent any further password recovery attempts within a predefined time period (e.g., 15 minutes, one hour, twenty four hours, etc.). Some embodiments keep track of recent password recovery attempts and allow a particular number within a predefined time period (e.g., three per hour, five per day, etc.). After denying access to the device, the process ends.

FIGS. 2 and 3 conceptually illustrate two different processes for performing password recovery with transient event data. One of ordinary skill in the art will recognize that other processes are possible as well. For example, a process that determines all of the questions ahead of time, but asks the user the questions one by one could perform just as well as either of the illustrated processes.

Figure 4:
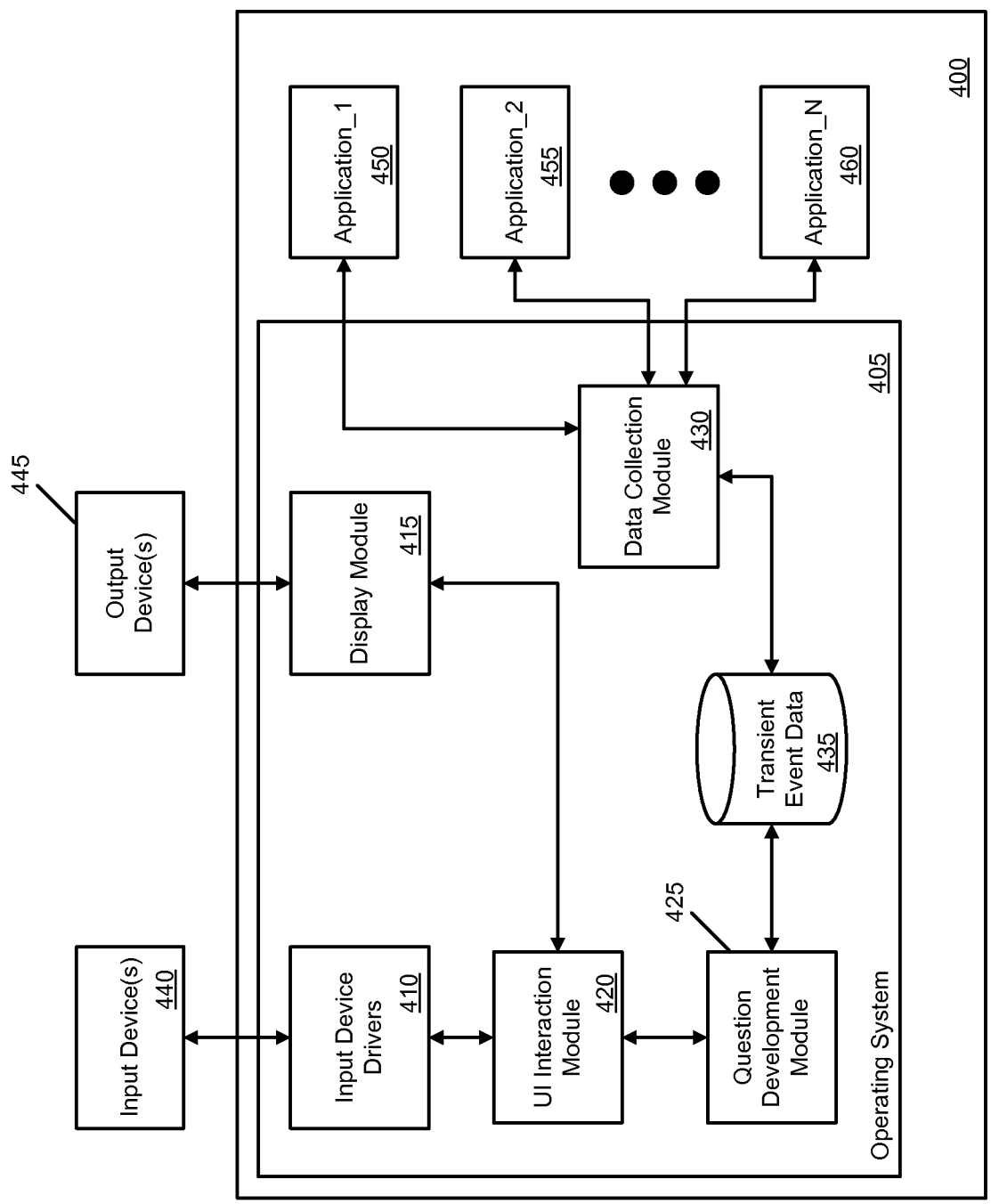
FIG. 4 conceptually illustrates the software architecture of a computing device of some embodiments that uses transient event data for password recovery FIG. 5 conceptually illustrates the architecture of a system of related applications of some embodiments.

FIG. 4 conceptually illustrates the software architecture of a computing device 400 of some embodiments that uses transient event data for password recovery. Computing device 400 includes an operating system 405 and a number of applications 450-460 that run on top of the operating system 405. Computing device 400 could be a personal computer, a smartphone or other such handheld device, etc.

The operating system 405 includes input device drivers 410, display module 415, user interface (UI) interaction module 420, question development module 425, and data collection module 430. The operating system also stores transient event data 435 in a data storage. The data storage may be a separate data storage or may be shared with other operating system functions and/or the other applications 450-460. For instance, the operating system 405 may store the transient event data 435 on a hard disk, solid-state memory, or other non-volatile storage that is used by all of the applications of the computing device.

In the illustrated example, the password recovery modules (e.g., the question development module 425, data collection module 430, and UI interaction module 420) are part of operating system 405. However, in other embodiments these are part of a separate password recovery application (i.e., one of applications 450-460) that runs on top of the operating system 405 and is able to access the operating system data (e.g., desktop image, login history, etc.) in order to collect transient event data.

The computing device 400 is also connected to one or more input devices 440 and output devices 445. The input devices 440 enable a user to input information to the computing device—e.g., user identifiers and passwords, indications that the user has forgotten a password, answers to password recovery questions, etc. The input devices may include a mouse, keyboard, microphone, etc. The output devices include display devices for displaying a user interface (e.g., a user interface displaying password recovery questions), speakers, etc. In some embodiments, the input devices 440 and output devices 445 overlap. For instance, in some embodiments input is received through a touchscreen that functions as both an input device and an output device.

When the user interacts with input devices 440 (e.g., touching a particular location on a touchscreen, typing in a password, clicking a mouse to answer a multiple choice question, etc.), these input devices 440 send signals to the input device drivers 410. The device drivers 410 translate the signals into user input data that is provided to the UI interaction module 420.

UI interaction module 420 is a module of operating system 405 that processes the user input data from the input device drivers and handles the output of a user interface to the display module 415. When the password recovery program is a separate application, the UI interaction module is part of that application in some embodiments. UI interaction module 420 recognizes when a user has entered a password or an answer to a password recovery question. Any answers to such questions are translated and sent to the question development module 425.

On the back end, data collection module 430 collects transient event data 435 from the various applications 450-460 run on the computing device. These applications may include office applications (e.g., spreadsheet applications, word processors, etc.), media-editing applications (e.g., video editors, photo editors, etc.), web browsers, e-mail clients, chat applications, etc. Data collection module 430 records events that take place for these applications. Such events include the launching of the application on the device as well as activities performed by the application (e.g., opening a document or media file, sending an e-mail, visiting a website, etc.). This data is collected and stored as transient event data. The data collection module also collects data from operating system 405 in some embodiments. Such data may include operating system settings (e.g., the desktop image, screen saver settings, etc.) as well as active events such as logons/logoffs, time of system setting changes, etc. In some embodiments, the data collection module 430 purges old transient event data after a particular length of time (e.g., three months, one week, etc.).

Question development module 425 handles the preparation of password recovery questions using the transient event data 435 collected by data collection module 430. Question development module 430 performs some or all of process 200 or 300 in some embodiments. It is the question development module in some embodiments that analyzes the transient event data and question pool to identify which questions should be asked of the user. In some embodiments, question development module also performs the comparison of a received user answer to a correct answer to determine whether the user has answered the question(s) correctly and whether the user should be authenticated. Some embodiments include a separate answer-checking module and/or authentication module, such that the question development module 425 just performs the question creation operations.

When the question development module 425 prepares a question, the relevant information is sent to the UI interaction module 420 which prepares the user interface to display to the user. This user interface data is passed to display module 415, which manages the actual output of the user interface to the screen of an output module 445. One of ordinary skill in the art will recognize that when the question is output as audio, an audio module in operating system 405 will handle the output to speakers.

As described above, once a question is displayed to the user via the user interface, the user uses an input device 440 to provide an answer to the question, which is interpreted by UI interaction module 420 and sent to question development module 425 (or a separate module) for checking against the correct answer.

B. Accessing a Set of Servers on a Network

Many applications today are provided via a network, specifically a network of networks such as the Internet. For instance, both the Google® and Yahoo® web sites provide a variety of applications (e-mail, photo storage, chat, etc.) to a user who can log into these services via one password. When a user forgets such a password, some embodiments of the invention use transient event data based on the user's recent use of the services to prepare password recovery questions for the user.

Figure 5:
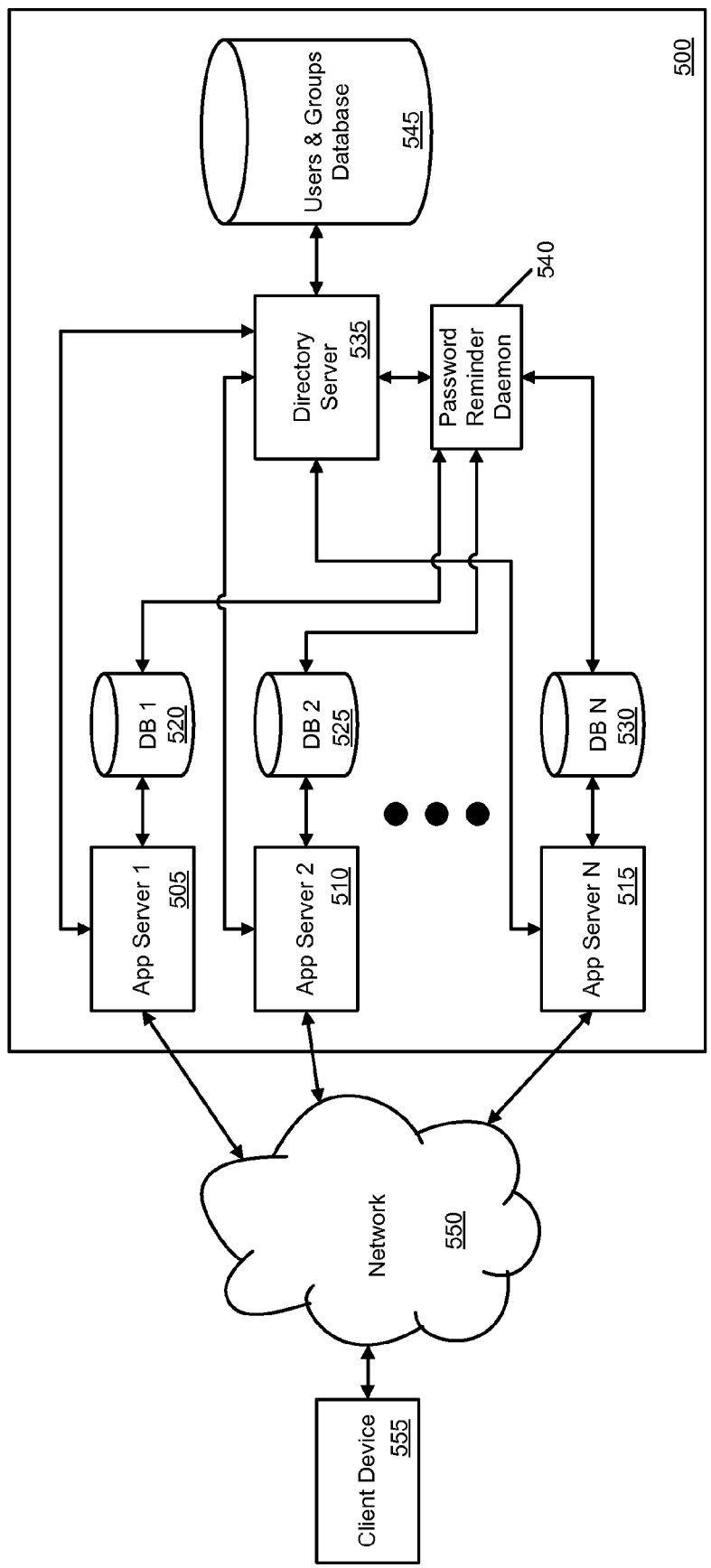

FIG. 5 conceptually illustrates the architecture of such a system 500 of related applications of some embodiments. System 500 includes a set of application servers 505-515, each of which has an accompanying database 520-530. Database 520, for example, stores information regarding user transactions with application server 505. For instance, if application server 505 is an e-mail server, database 520 might store the actual e-mails received and sent by the various users, the user's address book, etc. System 500 also includes a directory server 535, password reminder daemon 540, and a users and groups database 545.

As shown in FIG. 5, a user connects to system 500 through a network 550 from client device 555. Client device 555 may be a personal computer, a thin client terminal, a portable device such as a PDA or smartphone, etc. Network 550 may be a local area network, a wide area network, or a network of networks such as the Internet, among other options.

When the user wishes to log onto system 500 to use one or more of the application servers 505-515, the user directs the client device 555 to connect to the system 500. In some cases, this entails directing a web browser to a particular web site associated with one of the applications. A user then interacts with the application server for the particular application in order to login and perform various tasks.

As mentioned, application servers 505-515 may be for all sorts of server-based applications. Some examples of such applications include e-mail, chat, file storage (e.g., for media storage sites such as the Flickr® site, the Picasa® site, etc.), social networking, fantasy sports, etc.

Each of the application servers has a database 520-530 that stores all of the user data for the application. In many cases, the databases will store data for thousands, if not millions, of users. This stored data includes all of the user information relating to that specific application. For instance, if the application server runs a chat application, the associated database might store a contact list for each user, and if set to store history, a chat history. The databases 520-530 also store transient event data for the application server. Again using the example of the chat server, the transient event data stored in the databases could include user login history, chat history (e.g., User X chatted with User Y at time T), files transmitted via a chat application, etc.

When a user logs into system 500 via one of the application servers 505-515, directory server 535 and the users and groups database 545 becomes involved. The directory server 535 of some embodiments handles user authentication operations, and users and groups database 545 stores user login information (i.e., user IDs and associated passwords, which applications a user has permission to access, etc.). When a user logs on through an application server, the logon information (user ID and password) is sent to the directory server 535, which performs the task of determining whether the password matches the user ID. When the password matches, the directory server informs the application server that the user is validated. When the password does not match, a message is displayed to the user indicating that this is the case.

When the user indicates that he has forgotten his password, the directory server uses the password reminder daemon 540 to prepare password recovery questions for the user. In some embodiments, password reminder daemon 540 is a process running on directory server 535, while in other embodiments it is separate from the directory server (as shown).

Password reminder daemon 540 pulls transient event data from the application databases 520-530 in order to develop password recovery questions. In some embodiments, when the user is attempting to login through a particular application server, the daemon will focus on transient event data from the database associated with the particular application. In other embodiments, password reminder daemon 540 will pull transient event data from all of the databases for which there is data regarding the particular user. The password reminder daemon sends the developed questions and answers to the directory server 535 so that the directory server can handle the authentication of the user.

Figure 6:
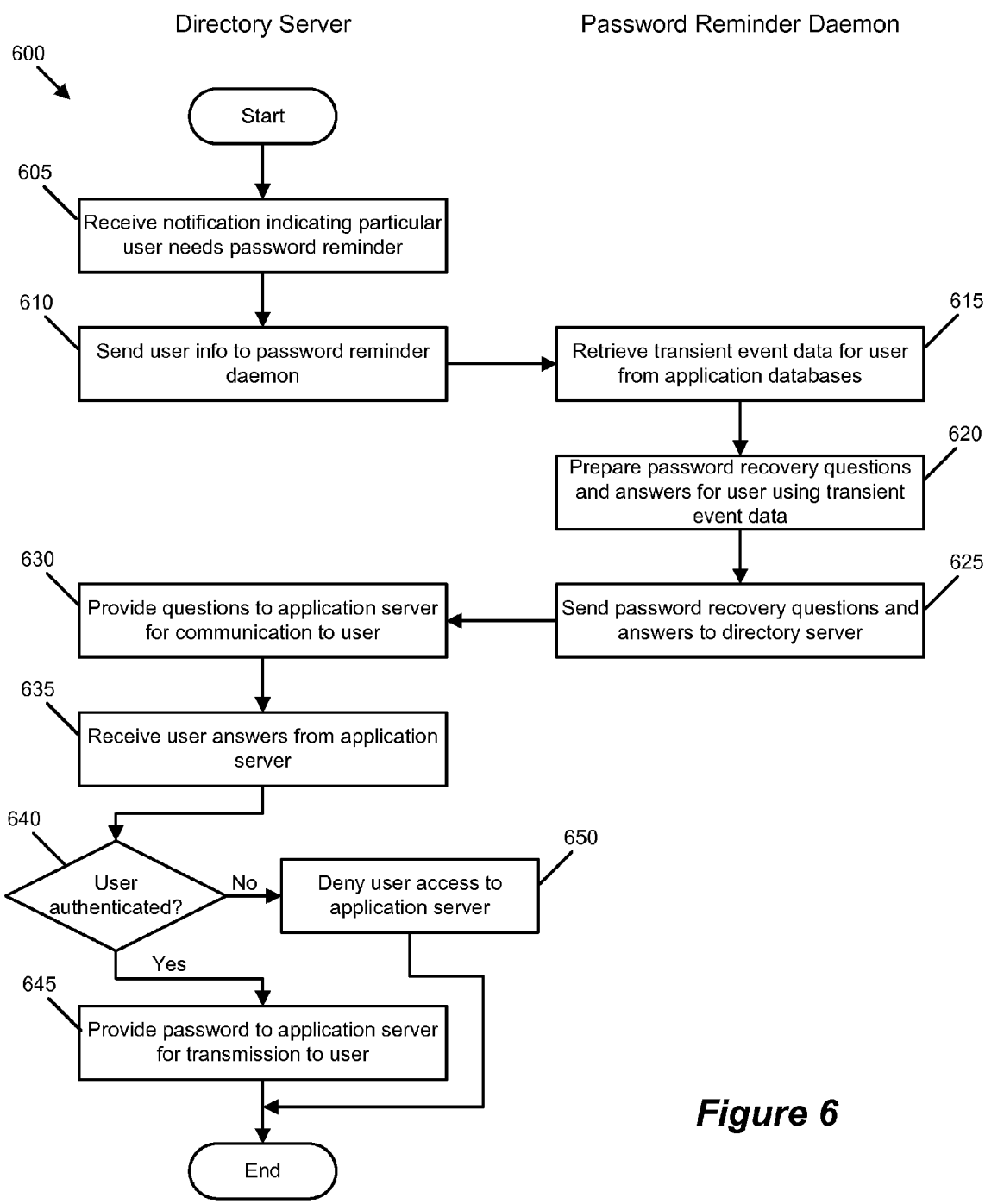
FIG. 6 conceptually illustrates a password recovery process performed by a system such as that illustrated in FIG. 5.

FIG. 6 conceptually illustrates a password recovery process 600 performed by a system such as that illustrated in FIG. 5. As illustrated in FIG. 6, portions of process 600 are performed by a directory server (e.g., directory server 535) and portions are performed by a password recovery module (e.g., password reminder daemon 540). As noted above, the password reminder daemon is actually part of the directory server in some embodiments. One of ordinary skill in the art will recognize that the process need not be performed by a server specifically referred to as a directory server and a module called a password recovery daemon, but rather any servers and/or modules that perform password recovery authentication.

As shown, process 600 begins by receiving (at 605) notification indicating that a particular user needs a password reminder. In some embodiments, the directory server receives this notification from one of the application servers (e.g., servers 505-515). Some application servers provide a user interface through a network to the user that includes a user interface item for the user to select when the user has forgotten his password. When the user selects the UI item, notification is sent to the directory server that the password recovery process needs to be performed for the user.

Next, the process sends (at 610) the user information to the password reminder daemon or similar module for developing password recovery questions. In some embodiments, this information is just a user ID and the indication that the user needs to recover his password (e.g., via a function call). When the password recovery module is located on a separate physical device, the information is transmitted to the separate device. On the other hand, in some embodiments, a function call is simply made to a module on the directory server.

The process then retrieves (at 615) transient event data for the user from the application databases (e.g., databases 520-530). The password recovery module retrieves all of the transient event data from all of the databases in some embodiments. In other embodiments, the password recovery module is aware of the applications to which the user has access, and only searches the corresponding databases for information. Some embodiments only retrieve data within a particular timeframe from the databases (e.g., 72 hours, one week, one month, etc.). For a particular application database, the transient event data can include any record of a user's transactions with the application—login and logoff times, use history, contacts, other application-specific information, etc.

Using the retrieved transient event data, process 600 next prepares (at 620) password recovery questions for the user to answer. Some embodiments have a preferred set of questions and begin at the top of this preferred order when selecting questions. Other embodiments weight the questions and also weight how current the data is. Yet other embodiments choose the questions randomly. In some such embodiments, the questions are weighted but chosen randomly (e.g., using a random selection in which a first question is twice as likely to be selected as another question). Some embodiments focus questions on the application that the user is attempting to access (that is, the application server that asked the directory server for password recovery), or focus the questions away from the application that the user is attempting to access. Some embodiments will not choose a question that has been previously asked during a password recovery operation within a threshold time period (e.g., the last week).

The questions chosen may also vary based on policies appropriate for the use scenario. For instance, if the application servers grant access to data with minimal confidentiality concerns, the questions may be designed to be easier than if access is being granted to financial information. As such, the questions in the former case may be easier and more geared towards simple multiple choice than in the latter case. In the case of financial or other highly confidential information, questions requiring the user to type an answer might be more likely.

As noted previously, a question can only be chosen when an answer exists for that question. Thus, if a user does not have access to or does not use a particular application server from the group of application servers, questions regarding the use of the particular application server will not be answerable. For instance, a user who just uses the system for e-mail and chat applications would not have any transient event data from a fantasy sports application server.

As described above, answers to the questions are also prepared. The questions may be different combinations of multiple choice questions with a single answer, multiple choice questions with multiple answers, questions to which the user must type in an answer, or other sorts of questions. In some cases, numerous possible correct answers must be prepared (e.g., if the question asks for someone e-mailed in the previous 24 hours). Section II describes in more detail the various types of questions that a password recovery application might ask a user.

Once the password recovery questions and answers are ready, the process sends (at 625) these to the directory server. The directory server then provides (at 630) the questions to the application server for communication to the user. One of ordinary skill in the art will recognize that when the password recovery module is part of the directory server, these two operations may be combined into one operation. Furthermore, when the user communicates directly with the directory server, the questions need not be sent to the application server but are instead sent directly to the user.

In the illustrated case, the application server handles the preparation of a user interface through which the question is presented to the user such that the user can answer the question. In some embodiments, the user interface presented to the user will depend on which application server the user is connected with. In other embodiments, all of the application servers in the system will present the same password recovery interface to the user. The user then answers the password recovery questions using his own device (e.g., client device 555).

These user answers are received (at 635) by process 600 from the application server. Process 600 illustrates the situation in which all of the questions are presented to the user at once and then all of the answers are received at once as well. One of ordinary skill will recognize that some embodiments present one question and receive one answer at a time, and evaluate each answer before presenting the next question to the user. Some embodiments prepare one question at a time and do not prepare the next question until the previous question is answered and the answer evaluated.

Returning to process 600, after the answers are received, the process determines (at 640) whether the user is authenticated. In some embodiments, this involves determining whether each of the questions is answered correctly and then whether the user has answered enough of the questions correctly. For multiple choice questions, determining whether the question is answered correctly is fairly simple. However, when the question is answered via a typed answer, the process must account for multiple possible answers, different spellings, shortened answers, etc., as described above with respect to process 200.

When a user answers all of the questions correctly, the system will authenticate the user. If all of the user's answers are wrong, then the user will not be authenticated. Some embodiments authenticate a user even if one or two questions are answered incorrectly (e.g., a user must answer six of seven questions correctly, or a similar ratio). When the user answers enough of the questions correctly to be authenticated, the process provides (at 645) the user's password to the application server for transmission to the user. In some embodiments, this is a new temporary password that allows the user to log into the application server and then reset the password. In other embodiments, the user is directly presented with the opportunity to choose a new password. Some embodiments, though, provide the user with his previous password. Some embodiments automatically log in to the application server while providing the password (either new or old) to the user.

The password is displayed within the user interface presented to the user in some embodiments, while other embodiments send the user the password via e-mail. Of course, if the user is attempting to gain access to an e-mail server, then the password cannot just be mailed to the user's e-mail address associated with that server, as it would do the user no good. In such a situation, the password is either displayed to the user through the user interface or sent to a different e-mail address.

When the process determines that the user has failed to authenticate because too many of the answers are incorrect, the process denies (at 650) the user access to the application server and system. In some embodiments, this includes displaying a message to the user that the user has failed to properly authenticate. Some embodiments also prevent any further password recovery attempts within a predefined time period (e.g., 15 minutes, one hour, twenty four hours, etc.) for the user ID or from the user's client device (e.g., from a particular IP address). Some embodiments keep track of recent password recovery attempts and allow a particular number within a predefined time period (e.g., three per hour, five per day, etc.). After denying access to the device, the process ends.

C. Remotely Wiping Data from a Portable Device

The above uses of transient event data focus on a user recovering a password or getting a new password in order to access a device or network-based system. Another situation in which transient event data may be used occurs when a user loses a portable device such as a smartphone (e.g., IPhone®) that may contain personal or confidential information that the user does not want anyone else to access. Often such a device will have password protection, but it is possible that if given long enough the finder (or thief) of such a device will be able to crack the password.

In some embodiments, the device password is different from the password for accessing the device remotely in order to wipe the data off of the device. In fact, in some cases a user will never have set a remote access password and thus will have to be authenticated using transient event data-based questions, as if the user had forgotten his remote access password.

Figure 7:
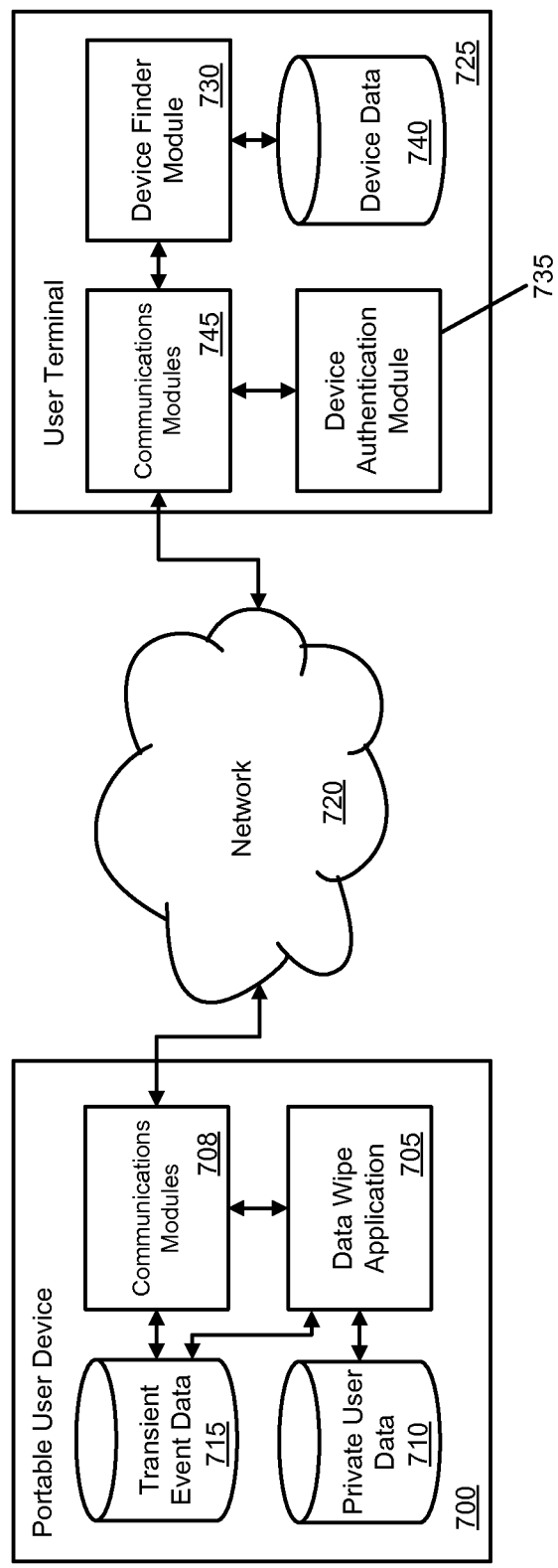
FIG. 7 conceptually illustrates a portable user device to which a terminal connects according to some embodiments.

FIG. 7 conceptually illustrates a portable user device 700. Device 700 can be any electronic device that is portable and capable of connection to the Internet. Examples of such devices include PDAs, smartphones (e.g., IPhone®, Blackberry®, etc.), laptops (although a lost laptop is less likely to be connected to the Internet such that it can be remotely accessed), etc. As shown, device 700 includes a data wipe application 705 and communication modules 708. The device also includes private user data 710 and transient event data 715.

The communications modules 708 represent one or more modules for providing communication with external networks and devices. For instance, when the portable user device is a smartphone, the communications modules 708 may provide one or more of GSM/GPRS/EDGE connectivity, CDMA connectivity, 802.11 (Wi-Fi) connectivity, Ethernet connectivity etc. The communications modules 708 are capable of handling data transmissions (as opposed to merely telephony traffic) in some embodiments.

Data wipe application 705 is an application that clears the data from the device 700 such that it is unrecoverable. In some embodiments, this is a time-intensive process that goes bit by bit through the data on the device and securely deletes the data. In other embodiments, the data wipe application securely deletes an encryption key that is needed to access any of the data on the device. The data deleted includes the private user data 710 and, in some embodiments, the transient event data 715. These data may be stored separately in some embodiments (as shown), or may be stored within one physical storage. For instance, many devices will only include one hard drive, SD card, or similar storage, and the data wipe application will securely delete the entire contents of the storage, leaving only firmware intact. The data wipe application 705 is an application that can be activated remotely in some embodiments by the provision of a password or other form of authentication.

The transient event data 715 may include data regarding any user interactions with the device and applications on the device. For instance, if the device is a phone, the event data might include recent incoming and outgoing phone calls or messages (SMS messages, e-mails, voice messages, etc.). The transient event data might also include settings such as the background screen image, the ringtone, etc.

While the data wipe application 705 is the only application illustrated on the portable device 700 other than communications modules 708, one of ordinary skill in the art will recognize that most devices will include numerous applications, both in firmware and in software. For instance, the device 700 will generally include an operating system, e-mail client, etc., as well as various user-added applications that are not shown in FIG. 7. As the data wipe application 705 is an application that erases the data in a hard disk or other storage, in some embodiments this application is part of the device firmware.

FIG. 7 illustrates that portable device 700 can connect through a network 720 to user terminal 725. User terminal 725 could be, for example, a personal computer belonging to the same user as the device 700 in some embodiments. In other embodiments, user terminal 725 is an exchange server with which the device 700 is registered (e.g., for receiving e-mail in a work setting).

In either case, the user terminal stores device data 740 that includes at least the necessary information to connect to device 700 (i.e., information uniquely identifying the device such that the terminal can connect to the device over network 720). In some embodiments, device data 740 also includes a backup of private user data 710 and/or transient event data 715. Some embodiments provide a feature that enables a user to connect the device 700 directly to terminal 725 (while the user is still in possession of the device) in order to back up the data on the device.

When the user has lost device 700 (e.g., left the device in a public place, had the device stolen, etc.), the user may wish to erase all of the data stored on the device in case someone is able to access it. As such, terminal 725 includes a device finder module 730 and device authentication module 735. In some embodiments, these modules are stand-alone applications, while in others they are part of a larger application or suite of applications. In yet other embodiments, one or both of these modules is integrated into the operating system of user terminal 725. The user terminal 725 also includes communications modules 745. The communication modules 745 represent one or more modules for providing communication with external networks and devices. For instance, the communications modules may provide one or more of Ethernet connectivity, 802.11 (Wi-Fi) connectivity, etc.

In some embodiments, the modules and storage shown (device finder module 730, device authentication module 735, communications module 745, and device data 740) are actually located on a remote server that is accessed through the Internet via a user terminal. The user logs into the remote server in order to access the device finder feature. In some embodiments, the remote server may also include an authentication system that uses transient event data in case the user forgets a password for accessing the server.

Device finder module 730 is an application that, when run by the user, seeks out the portable user device 700 using device data 740. Some embodiments require the portable user device 700 to be connected to the Internet in order for the device finder to locate the user device. When the device is a smartphone, it will generally be connected to the Internet when it is connected to a 3G or 4G network, or if Wi-Fi (e.g., 802.11b, 802.11g) connectivity is turned on and the device is in range of an accessible and allowed network. In some embodiments, device finder module 730 enables the user to identify the physical location of his device 700, when the device includes GPS functionality or can be located using WiFi or cell tower triangulation.

The device finder module 730, in some embodiments, also enables the user to connect to the device 700 (through communications modules 745 on the user terminal and communications modules 708 on the device) in order to run the data wipe application 705. In some embodiments, once user terminal 725 is connected to device 700, the device finder module is allowed access to device the device in order to retrieve the transient event data 715. Other embodiments only use transient event data that is already stored as device data 740.

Some embodiments require a password for the user to access the data wipe application 705 remotely. The device authentication module 735 on terminal 725 allows a user to access the data wipe application even when the user forgets this password or has never set up such a password. As in the situations described above, the device authentication module presents the user with a set of questions based on the transient event data, and if the user correctly answers enough of these questions then the user can remotely wipe the data off of the device 700.

Figure 8:
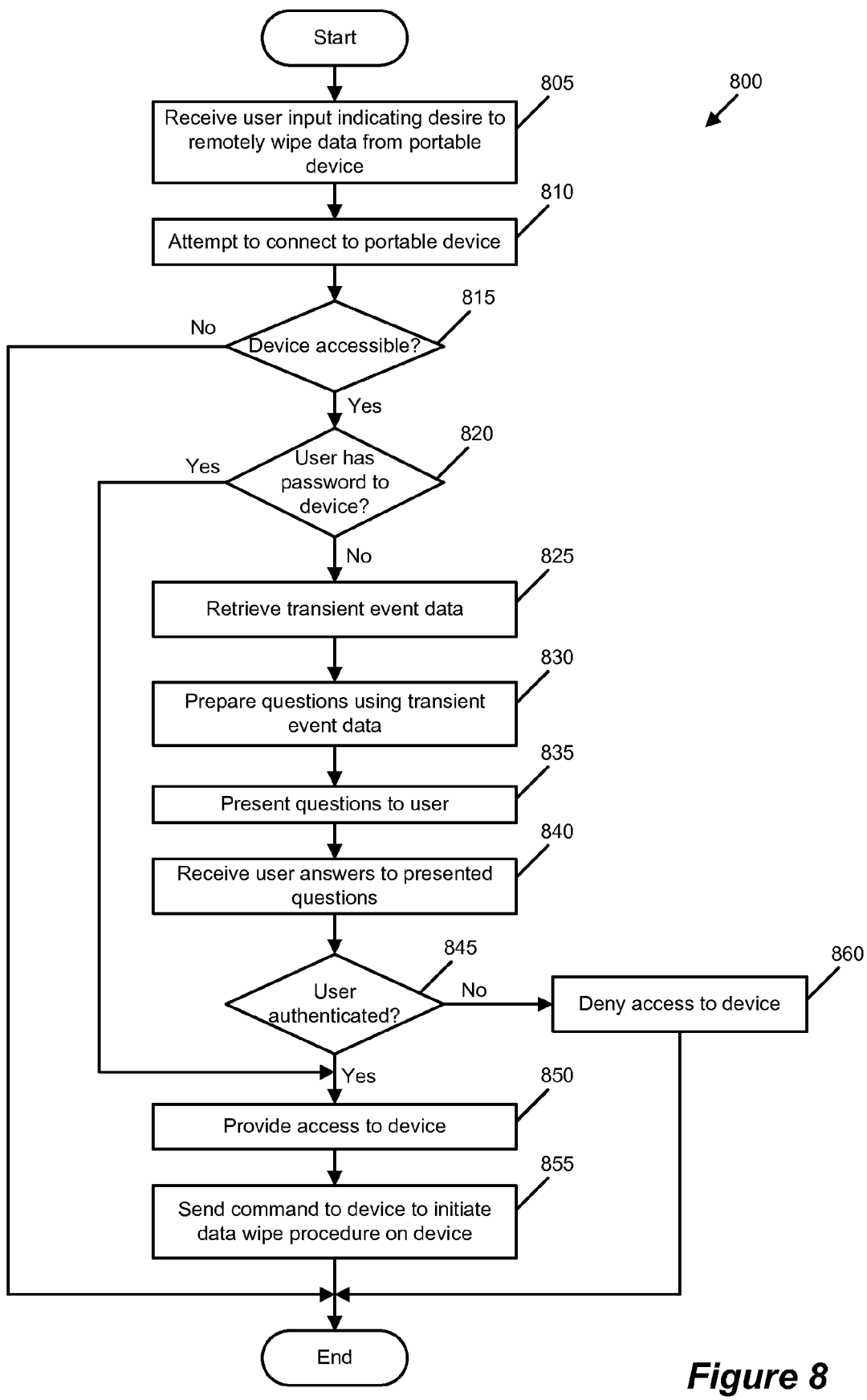
FIG. 8 conceptually illustrates a process for remotely accessing a portable device in order to erase all of the data from the portable device.

FIG. 8 conceptually illustrates a process 800 for remotely accessing a portable device (e.g., device 700) in order to erase all of the data from the portable device. Process 800 may be performed in various embodiments by a personal computer or similar device such as user terminal 725, or by a remote server that a user logs into from a personal computer, smartphone, etc.

As shown, process 800 begins by receiving (at 805) user input indicating a desire to remotely wipe data from a portable device such as a smartphone. The user might have lost his device, had the device stolen, or have some other reason for wanting to delete the data. In some embodiments, the user selects a button in a user interface indicating the need to find the device or remotely wipe data from the device in order to initiate process 800.

The process then attempts (at 810) to connect to the portable device. In some embodiments, the device must be connected to a data network (e.g., a Wi-Fi network, a 3G or 4G wireless telecommunications network, etc.) for the connection to be made. If the device is not connected to a network, there will be no way to remotely send the commands necessary to wipe data from the device.

The process then determines (at 815) whether the device is accessible. When the device is not accessible, the process ends as there is no way to wipe the data. Otherwise, the process determines (at 820) whether the user has a password to access the device remotely. Some embodiments, even if the user has logged into a remote server or is on his own machine, require the user to provide a different password in order to remotely access the device. In some embodiments, the portable device has a password to unlock the screen of the device, and the password for remote access is the same. In other embodiments, the remote access password is a different password. For example, a user might want a more complex password for remote access. In some cases, a user might never have set up a remote access password.

When the user has the password to access the device, the process does not have to ask authentication questions based on transient event data, and proceeds to 855, described below. Otherwise, the process retrieves (at 825) transient event data. In some embodiments, the transient event data on the device is accessible to a user terminal or remote server even before the device is fully accessed, and this data is retrieved by process 800. In other embodiments, the process must retrieve any transient event data stored as part of the device data on the terminal or server.

The transient event data for the portable device may include a wide variety of data. For example, the data may include the last time the device was accessed physically, recent phone calls, e-mails, or other messages sent or received, names of recently called contacts, applications run recently and data generated by those applications, as well as a multitude of other data.

Using the retrieved transient event data, the process then prepares (at 830) questions for the user to answer. As described above, some embodiments base the questions off of any of the transient event data. Some embodiments have a preferred set of questions and begin at the top of this preferred order when selecting questions. Other embodiments weight the questions and also weigh how current the data is. Yet other embodiments randomly choose questions from a pool. Some embodiments will not choose a question that has been asked during a remote access attempt within a threshold time period (e.g., the last 24 hours).

As noted above, the process can only choose a question when an answer exists for the question. For instance, if a user never browses the web on the portable device, no questions about recently visited web pages can be asked. Similarly, if the user has never opened a document on the device, then questions regarding recent document usage cannot be asked.

As described with respect to process 200, answers to the questions must also be prepared. The questions may be different combinations of multiple choice questions with a single answer, multiple choice questions with multiple answers, questions to which the user must type in an answer, or other sorts of questions. In some cases, numerous possible correct answers must be prepared (e.g., if the question asks for someone e-mailed in the previous 24 hours). Section II describes in more detail the various types of questions that a password recovery application may ask a user.

Once the questions and answers are prepared, the process presents (at 835) the questions to the user. The process then receives (at 840) user answers to the presented questions. When the process is performed by the terminal at which the user is located (e.g., the user's personal computer), some embodiments present the questions to the user via a user interface at the terminal and receive the answers through the user's interaction with that terminal or input devices connected to the terminal. When the process is performed by a server remote to the user, some embodiments send a user interface with the questions to the device at which the user is located and receive the answers from that device based on the user's interactions.

In the case illustrated by process 800, all of the questions are presented to the user and then all of the answers are received. One of ordinary skill will recognize that some embodiments present one question and receive one answer at a time, and evaluate each answer before presenting the next question to the user. Some embodiments prepare one question at a time and do not prepare the next question until the previous question is answered and the answer evaluated.

After all of the answers are received, process 800 determines (at 845) whether the user is authenticated to remotely access the portable device. In some embodiments, this involves determining whether each of the questions is answered correctly and then whether the user has answered enough of the questions correctly. For multiple choice questions, determining whether the question is answered correctly is fairly simple. However, when the question is answered via a typed answer, the process must account for multiple possible answers, spelling differences, shortened answers, etc., as described above with respect to process 200.

When a user answers all of the questions correctly, the process will authenticate the user. If all of the user's answers are wrong, then the user will not be authenticated. Some embodiments authenticate a user even if one or two questions are answered incorrectly (e.g., a user must answer six of seven questions correctly, or a similar ratio). When the user answers enough of the questions correctly to be authenticated, the process provides (at 850) access to the device to the user. Even if the user previously had a password for remote access, this need not be given to the user in some embodiments as the password will be wiped from the portable device memory anyway.

The process then sends (at 855) a command to the remote device to initiate a data wipe procedure. This procedure is part of the firmware of the portable device in some embodiments, and wipes out all of the user's data from the various storages (e.g., private user data 710). In some embodiments, this is a time-intensive process that securely deletes and randomly overwrites all of the data. In other embodiments, the data is encrypted on the device and the decryption key is severely deleted.

On the other hand, when the user is not authenticated, the process denies (at 860) access to the remote device. Some embodiments prevent further remote access attempts to the device within a predefined time period (e.g., 30 minutes, two hours, two days, etc.). Some embodiments keep track and allow a particular number of attempts within a predefined time period (e.g., three per hour, etc.). After either denying access or initiating the data wipe procedure, the process ends.

The three examples in the subsections above illustrate different situations in which transient event data is used for password recovery or similar access processes. One of ordinary skill in the art will recognize that other situations will use transient event data for authentication purposes as well. For instance, password recovery for website access (e.g., to social networking sites, personal account info from banks or credit cards, etc.) could use transient event data to generate questions.

II. Graphical User Interface for Password Recovery

As noted in the section above, some embodiments present password recovery questions to a user via a graphical user interface (GUI). The user interacts with the GUI differently in different embodiments. Some embodiments use a touchscreen for user interaction, while some embodiments use a cursor controller (e.g., mouse, stylus and trackpad, touchpad, etc.) and/or a keyboard input.

FIGS. 9-13 illustrate example of GUIs of some embodiments presented to a user for password recovery. The GUIs illustrated in these figures may be a portion of a GUI in some embodiments. For instance, in many cases the GUI includes additional decorative features identifying the website, server, device, etc., that the user is attempting to access. Furthermore, the illustrated GUIs are part of a larger GUI with additional functional features in some embodiments.

Figure 9:
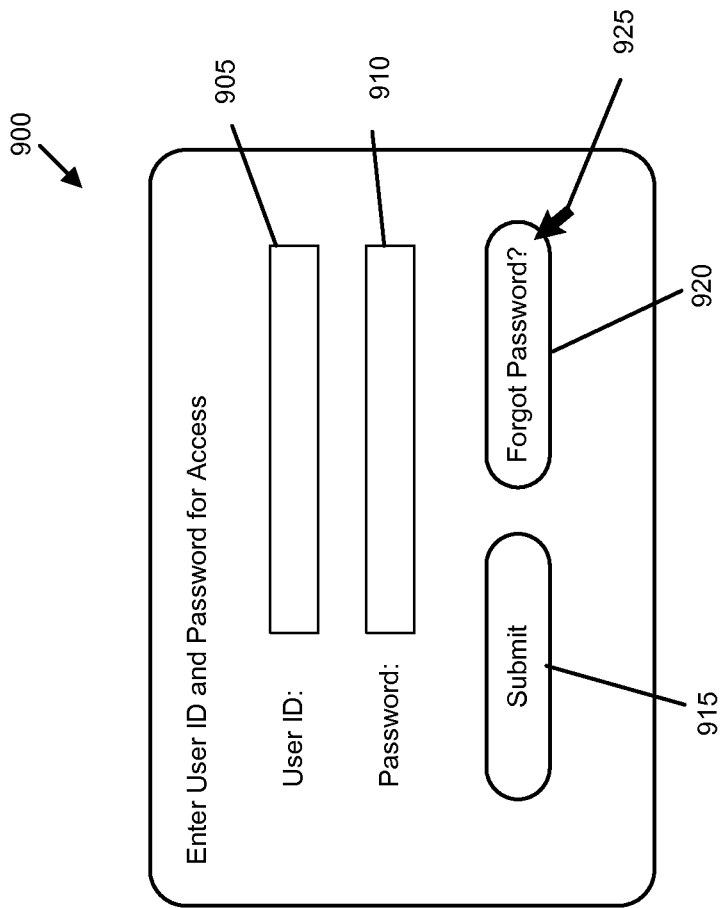
FIG. 9 illustrates a GUI of some embodiments that enables a user to access a password recovery process.

FIG. 9 illustrates a GUI 900 of some embodiments that enables a user to access a password recovery process. GUI 900 could be a bootup screen for a device, a website access screen or portion thereof, etc. The GUI includes two boxes 905 and 910 that a user can fill in with his ID and password. The GUI also includes two buttons—a submit button 915 to enter an ID and password typed into boxes 905 and 910 for verification, and a button 920 to select when the user has forgotten his password. As illustrated in FIG. 9, a user is using cursor 925 to select the password retrieval button 920. Selection of button 920 initiates the password recovery process using transient event data.

FIG. 10 illustrates a GUI 1000 of some embodiments used when all of the password recovery questions are presented to the user at once. GUI 1000 includes six questions 1005-1030, all of which are based on transient event data. As shown in FIG. 10, the user has currently answered questions 1005-1015 and is in the process of answering a fourth questions 1020 by selecting one of the answers with a cursor 1035. In this example, all of the questions are multiple choice with four possible answers. When the user has finished answering all of the questions, the user clicks submit button 1040 (e.g., using the cursor 1035) in order to be authenticated.

The questions 1005-1030 are the sort of questions that could be asked when a user attempts to access a locked device, login to a network (e.g., a corporate network), or access a remote device (e.g., as illustrated in Section 1.0 above). The questions are on the topics of recently-used applications, recent e-mail subjects and recipients, the current screensaver for the device, recent documents opened for editing, and recently-viewed websites.

Figure 11:
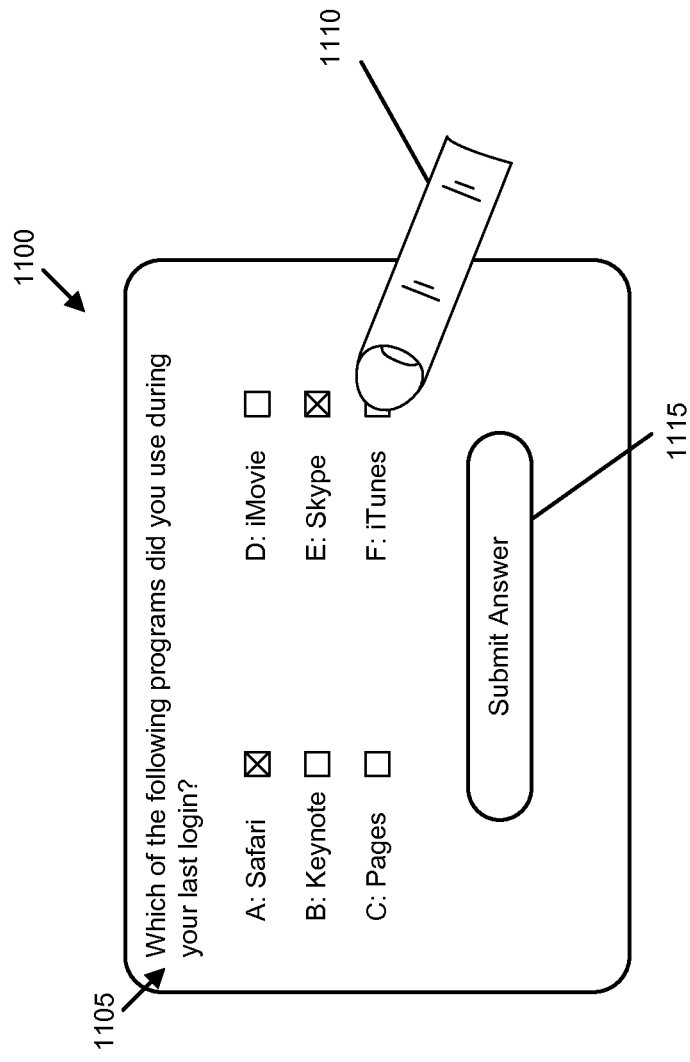
FIGS. 11-13 illustrate GUIs of some embodiments that present one password recovery question based on transient event data.

FIG. 11 illustrates a GUI 1100 of some embodiments that presents one password recovery question 1105 based on transient event data. Question 1105 is a multiple choice question dealing with recently-used applications, but asks the user to select anywhere from one to six of the six possible answer choices. As shown, the user has selected two answer choices so far and is about to select a third using his finger 1110. This is an example of a GUI being presented on a touchscreen interface. When the user has selected the answer he believes to be correct, the user will touch the submit button 1115 in order to have the question checked for authentication purposes.

Figure 12:
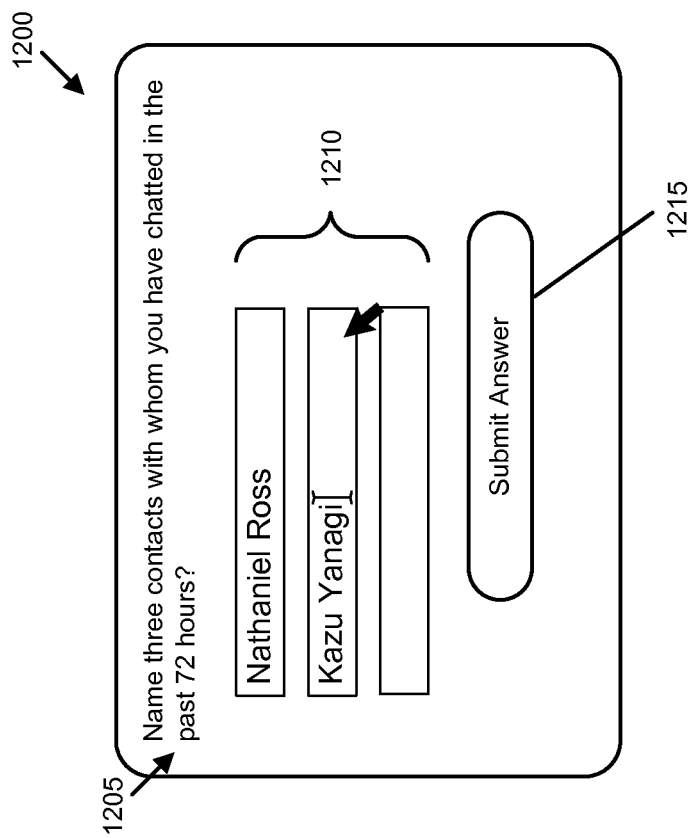

FIG. 12 illustrates a GUI 1200 that also presents a single password recovery question 1205 based on transient event data. Question 1205 forces the user to fill in the answers without multiple choice options. In this question, the user is asked to type into text boxes 1210 the names of three contacts with whom the user has chatted. Similar questions could be asked regarding e-mail recipients and senders. Furthermore, other questions such as question 1105 could also be asked in such a form so that the user is required to type in the names of different programs used. Questions of this nature will accept misspellings or short forms of names in some embodiments (e.g., "Nathaniel" instead of "Nathaniel Ross"). Once the names the user believes to be correct are typed in, the user will select submit button 1215 to have the question checked for authentication purposes.

Figure 13:
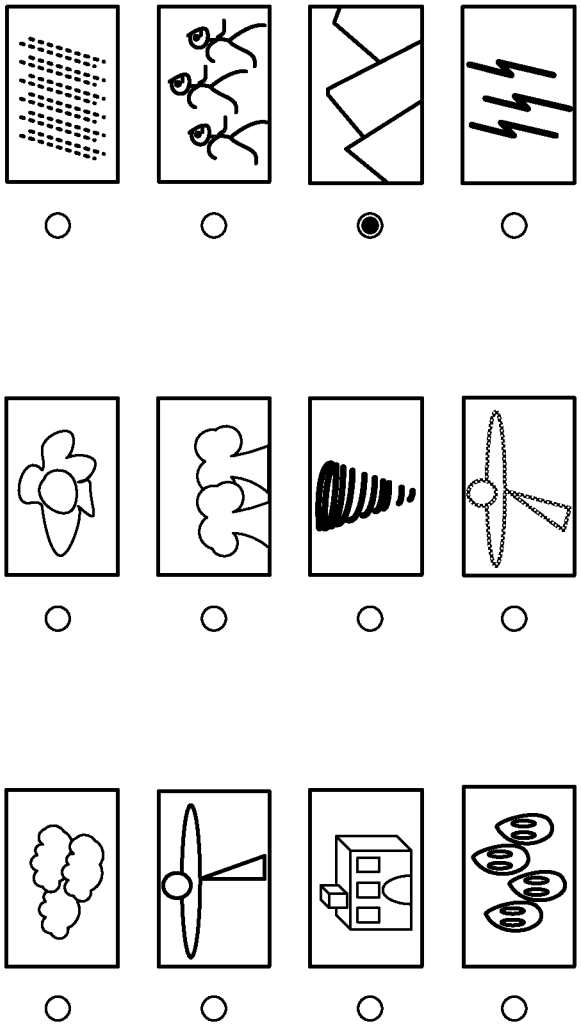

Finally, FIG. 13 illustrates a GUI 1300 that presents a multiple choice question 1305 to a user. Question 1305 is also based on transient event data, specifically the user's desktop image. A similar question could be asked for a background screen image on a smartphone or similar device. This question presents twelve different options—some embodiments present more or fewer choices. For such a question, some embodiments pull the options from any images that can be found on the device's permanent storage (e.g., hard disk, solid-state memory), while others include stock images such as basic desktop backgrounds that are presented as default options to users. When the correct desktop background is not a stock image but rather one that the user has selected from his storage, multiple such images will be used so that there is not only one such option as an obvious answer.

One of ordinary skill will recognize that the questions shown in FIGS. 10-13 do not even begin to exhaust all possible authentication questions that could be asked of a user. Questions regarding all sorts of recent user actions on the computing resources that the user wishes to access could be asked. The questions of FIGS. 10-13 could be a series of questions for accessing a device. As shown, a series of questions need not all be the same type of question. A single series of questions can include multiple choice questions, typed answer questions, etc.

FIGS. 9, 10, 12, and 13 illustrate GUIs with which a user interacts via a cursor controller and/or keyboard, while FIG. 11 illustrates a GUI with which a user interacts via a touchscreen on which the GUI is displayed. One of ordinary skill will recognize that the GUIs of FIGS. 9, 10, 12, and 13 could be displayed on a touchscreen. When a user has to type in an answer (e.g., to answer question 1205), some embodiments display a keyboard on the touchscreen. Similarly, the GUI of FIG. 11 could be displayed on a standard, non-touchscreen display device while a user interacts with the GUI via a cursor controller and/or keyboard.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
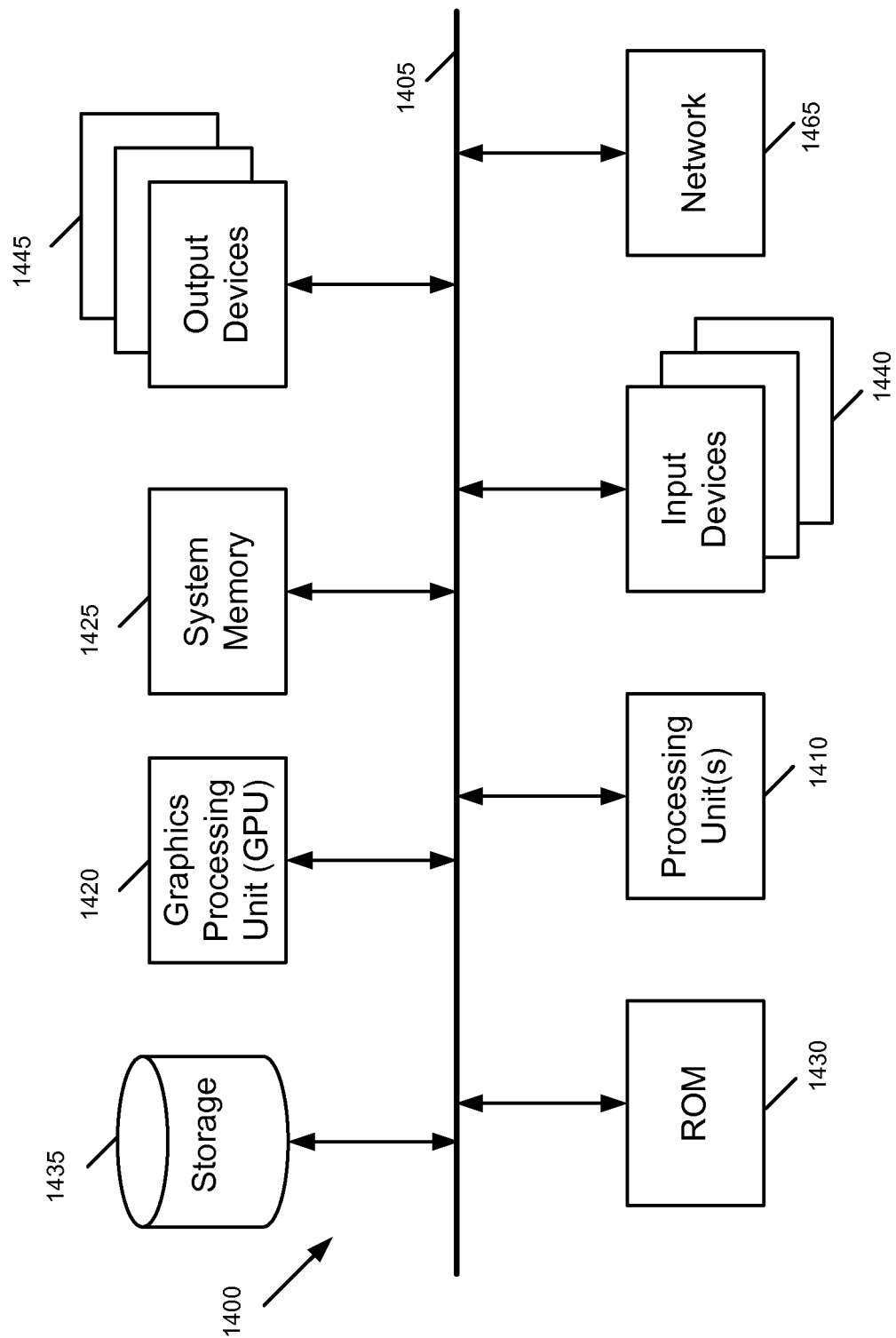
FIG. 14 conceptually illustrates an electronic system with which some embodiments of the invention are implemented.

FIG. 14 conceptually illustrates an electronic system 1400 with which some embodiments of the invention are implemented. The electronic system 1400 may be a computer, phone, PDA, or any other sort of electronic device. Such an electronic system includes various types of computer readable media and interfaces for various other types of computer readable media. Electronic system 1400 includes a bus 1405, processing unit(s) 1410, a graphics processing unit (GPU) 1420, a system memory 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the GPU 1420, the system memory 1425, and the permanent storage device 1435.

From these various memory units, the processing unit(s) 1410 retrieve instructions to execute and data to process in order to execute the processes of the invention. The processing unit(s) may be a single processor or a multi-core processor in different embodiments. Some instructions are passed to and executed by the GPU 1420. The GPU 1420 can offload various computations or complement the image processing provided by the processing unit(s) 1410. In some embodiments, such functionality can be provided using CoreImage's kernel shading language.

The read-only-memory (ROM) 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, or ZIP® disk, and its corresponding disk drive) as the permanent storage device. Like the permanent storage device 1435, the system memory 1425 is a read-and-write memory device. However, unlike storage device 1435, the system memory is a volatile read-and-write memory, such as a random access memory. The system memory stores some of the instructions and data that the processor needs at runtime. In some embodiments, the invention's processes are stored in the system memory 1425, the permanent storage device 1435, and/or the read-only memory 1430. For example, the various memory units include instructions for processing multimedia items in accordance with some embodiments. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the electronic system. The input devices 1440 include alphanumeric keyboards and pointing devices (also called "cursor control devices"). The output devices 1445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples electronic system 1400 to a network 1465 through a network adapter (not shown). In this manner, the computer can be a part of a network of computers (such as a local area network ("LAN"), a wide area network ("WAN"), or an Intranet, or a network of networks, such as the internet. Any or all components of electronic system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD-RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 1, 2, 3, 6, and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

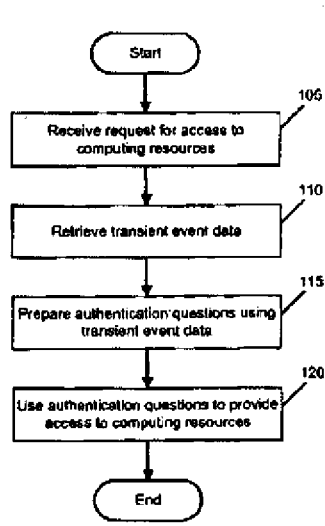

The invention claimed is:

1. A non-transitory computer readable storage medium configured to store instructions that, when executed by a processor included in a computing device, cause the computing device to authenticate a remote user, by carrying out steps that include:
   receiving a notification that the remote user is unable to provide correct authentication information for accessing a set of application servers, wherein the correct authentication information comprises a valid digital certificate;
   generating authentication questions for the remote user using transient event data regarding previous interactions of the remote user with the set of application servers, the authentication questions for presentation to the remote user, wherein:
      generating comprises selecting the authentication questions randomly from a pool of authentication questions such that authentication questions based on recently-generated transient event data are more likely to be selected than authentication questions based on older transient event data,
      a difficulty of the authentication questions is proportional to a confidentiality level of data to which the set of application servers grant access, and
      the transient event data comprises at least one of a current desktop remote image of the remote user, a current screensaver, or a list of other devices recently connected to a portable device of the remote user; and
   validating the remote user based on answers to the authentication questions.

2. The non-transitory computer readable storage medium of claim 1, wherein the steps further include:
   receiving answers from the remote user to the authentication questions;
   determining whether the received answers are correct; and
   determining that enough of the received answers are correct for the remote user to be validated.

3. The non-transitory computer readable storage medium of claim 2, wherein the remote user is validated only when all of the answers are correct.

4. The non-transitory computer readable storage medium of claim 2, wherein the remote user is validated when more than a particular percentage of the answers are correct.

5. The non-transitory computer readable storage medium of claim 1, wherein the steps further include refusing validation to the remote user based on answers to the authentication questions.

6. The non-transitory computer readable storage medium of claim 5, wherein the steps further include:
   receiving answers from the remote user to the authentication questions;
   determining whether the received answers are correct; and
   determining that not enough of the received answers are correct for the remote user to be validated.

7. The non-transitory computer readable storage medium of claim 1, wherein the set of application servers comprises a plurality of application servers.

8. The non-transitory computer readable storage medium of claim 1, wherein the correct authentication information comprises a user identifier and password.

9. The non-transitory computer readable storage medium of claim 1, wherein the set of application servers comprises an e-mail server.

10. The non-transitory computer readable storage medium of claim 9, wherein: the transient event data comprises recipients of recent e-mails from the remote user, and one of the authentication questions requires the remote user to type a name of a recipient,
   the transient event data comprises a plurality of documents recently opened on the portable device and one of the authentication questions requires the remote user to identify one document of the plurality of documents,
   the transient event data comprises a plurality of times at which the remote user logged into or logged out of the portable device, and one of the authentication questions requires the remote user to identify one time of the plurality of times,
   the transient event data comprises data generated by one or more applications recently executed on the portable device and one of the authentication questions requires the remote user to identify the data, or
   the transient event data comprises a ringtone used on the portable device, and one of the authentication questions requires the remote user to identify the ringtone.

11. The non-transitory computer readable storage medium of claim 1, wherein the set of application servers comprises a chat server.

12. The non-transitory computer readable storage medium of claim 11, wherein the transient event data comprises contacts recently chatted with by the remote user and one of the authentication questions requires the remote user to select a particular contact from a list of contacts.

13. The non-transitory computer readable storage medium of claim 1, wherein the steps further include retrieving the transient event data from a set of databases for storing the transient event data.

14. The non-transitory computer readable storage medium of claim 13, wherein the set of databases comprises a separate database for each application server in the set of application servers.

15. A non-transitory computer readable storage medium configured to store instructions that, when executed by a processor included in a server computer system, cause the server computer system to carry out steps that include:
   receiving, from a portable device, a notification that a user of the portable device is requesting to remove personal data from the portable device;
   connecting remotely to the portable device and retrieving transient event data from the portable device in response to receiving the notification, the transient event data regarding previous interactions of the user with the portable device;
   generating authentication questions for the user based on the retrieved transient event data in response to retrieving the transient event data, the authentication questions for presentation to the user, wherein:

generating comprises selecting the authentication questions randomly from a pool of authentication questions such that authentication questions based on recently-generated transient event data are more likely to be selected than authentication questions based on older transient event data, a difficulty of the authentication questions is proportional to a confidentiality level of the personal data to which the server grants access, and the transient event data comprises a current desktop image of the user, a current screensaver, or a list of other devices recently connected to the portable device;

sending the authentication questions to the portable device in response to generating the authentication questions; and in response to receiving, from the portable device, a sufficient number of correct answers provided by the user:
initiating a procedure on the portable device to remove the personal data from the portable device.

16. The non-transitory computer readable storage medium of claim 15, wherein the portable device is a smartphone.

17. The non-transitory computer readable storage medium of claim 15, wherein the portable device comprises firmware and the personal data does not include the firmware.

18. The non-transitory computer readable storage medium of claim 15, wherein the personal data comprises the transient event data.

19. The non-transitory computer readable storage medium of claim 15, wherein the steps further include identifying a physical location of the portable device and including the physical location in the transient event data.

20. A method, comprising:
at a server computer system;
receiving, from a portable device, an indication that a user of the portable device is unable to provide correct authentication information for accessing the portable device, wherein the correct authentication information comprises a valid digital certificate;
connecting remotely to the portable device and retrieving transient event data from the portable device in response to receiving the indication, the transient event data regarding previous interactions of the user with the portable device;
generating authentication questions for the user based on the retrieved transient event data in response to retrieving the transient event data, the authentication questions for presentation to the user, wherein:
generating comprises selecting the authentication questions randomly from a pool of authentication questions such that authentication questions based on recently-generated transient event data are more likely to be selected than authentication questions based on older transient event data,
a difficulty of the authentication questions is proportional to a confidentiality level of data to which the server grants access, and
the transient event data comprises a current desktop image of the user, a current screensaver, or a list of other devices recently connected to the portable device;
sending the authentication questions to the portable device in response to generating the authentication questions; and
in response to receiving, from the portable device, a sufficient number of correct answers provided by the user:
providing access to the portable device to the user.

21. The method of claim 20, wherein providing access to the portable device to the user comprises at least one of providing a device password to the user and presenting an opportunity to the user to choose a new password for the portable device.

22. The method of claim 20, wherein the authentication questions include simple multiple choice authentication questions when the server computer system provides access to data with minimal confidentiality concerns.

23. The method of claim 20, wherein the authentication questions require the user to type an answer when the server computer system provides access to highly confidential information.

24. The method of claim 20, further comprising:
identifying a physical location of the portable device; and
including the physical location of the portable device in the transient event data.

25. The method of claim 20, wherein:
the transient event data comprises applications recently run by the user and data generated by use of the applications,
the transient event data comprises a plurality of documents recently opened on the portable device,
the transient event data comprises a plurality of times at which the user logged into or logged out of the portable device, or
the transient event data comprises a ringtone used on the portable device.

26. The non-transitory computer readable storage medium of claim 15, wherein:
the transient event data comprises a plurality of documents recently opened on the portable device, and one of the authentication questions requires the user to identify one document of the plurality of documents,
the transient event data comprises a plurality of times at which the user logged into or logged out of the portable device, and one of the authentication questions requires the user to identify one time of the plurality of times,
the transient event data comprises data generated by one or more applications recently executed on the portable device, and one of the authentication questions requires the user to identify the data, or
the transient event data comprises a ringtone used on the portable device, and one of the authentication questions requires the user to identify the ringtone.

* * * * *

UNITED STATES PATENT AND TRADEMARK OFFICE
CERTIFICATE OF CORRECTION

PATENT NO.         : 8,973,154 B2
APPLICATION NO.    : 12/699027
DATED              : March 3, 2015
INVENTOR(S)        : Kazu Yanagihara It is certified that error appears in the above-identified patent and that said Letters Patent is hereby corrected as shown below:

Delete Title Page, and replace with new Title Page. (Attached)

In the Claims

Column 23, line 46 (Claim 1, line 25): "desktop remote image" should read -- desktop image --.

Column 24, line 23 (Claim 10, line 7): "portable device and" should read -- portable device, and --.

Column 24, lines 32-33 (Claim 10, lines 16-17): "portable device and" should read -- portable device, and --.

Column 25, line 37 (Claim 20, line 2): "computer system;" should read -- computer system: --.

Column 26, line 57, insert the following omitted claim: -- 27. The method of claim 20, wherein the portable device is a smartphone. --.

Signed and Sealed this
Second Day of June, 2015

Michelle K. Lee
*Director of the United States Patent and Trademark Office*

(12) United States Patent
Yanagihara

(10) Patent No.: US 8,973,154 B2
(45) Date of Patent: Mar. 3, 2015

(54) AUTHENTICATION USING TRANSIENT EVENT DATA

(76) Inventor: Kazu Yanagihara, Cupertino, CA (US)

(*) Notice: Subject to any disclaimer, the term of this patent is extended or adjusted under 35 U.S.C. 154(b) by 1013 days.

(21) Appl. No.: 12/699,027

(22) Filed: Feb. 2, 2010

(65) Prior Publication Data

US 2011/0191838 A1 Aug. 4, 2011

(51) Int. Cl.
*G06F 7/04* (2006.01)
*H04L 9/32* (2006.01)
*G06F 15/16* (2006.01)
*G06F 21/00* (2013.01)
*H04L 29/06* (2006.01)

(52) U.S. Cl.
CPC ............... *H04L 9/321* (2013.01); *G06F 15/16* (2013.01); *G06F 21/00* (2013.01); *G06F 2221/2143* (2013.01); *H04L 63/308* (2013.01)
USPC ........................................ 726/28; 726/35

(58) Field of Classification Search
CPC ....... G06F 21/00; G06F 21/10; G06F 21/128; G06F 21/30; G06F 21/305; G06F 21/31; G06F 21/33; G06F 21/60; G06F 21/6245; G06F 21/88; G06F 2221/2103; G06F 2221/2115; G06F 2221/2133; G06F 2221/2143; H04L 9/32; H04L 9/321; H04L 63/08; H04L 63/083; H04L 63/10; H04L 63/105; H04L 63/30; H04L 63/308
USPC .................. 726/2-5, 7, 16-17, 19, 21, 26-28, 726/34-35; 713/182-184; 380/247
See application file for complete search history.

(56) References Cited

U.S. PATENT DOCUMENTS

| | | | |
|---|---|---|---|
| 5,942,947 A * | 8/1999 | Bhagwan | 331/8 |
| 6,775,782 B1 * | 8/2004 | Buros et al. | 726/2 |
| 7,174,454 B2 | 2/2007 | Roskind | |
| 7,512,806 B2 * | 3/2009 | Lemke | 713/186 |
| 7,538,674 B2 * | 5/2009 | Garfinkle | 340/572.1 |
| 7,895,662 B1 * | 2/2011 | Scales et al. | 726/27 |
| 8,254,884 B2 * | 8/2012 | Kahandaliyanage | 455/410 |
| 8,392,975 B1 * | 3/2013 | Raghunath | 726/7 |
| 2003/0051164 A1 * | 3/2003 | Patton | 713/201 |
| 2003/0154406 A1 * | 8/2003 | Honarvar et al. | 713/201 |
| 2004/0030934 A1 * | 2/2004 | Mizoguchi et al. | 713/202 |
| 2004/0230843 A1 * | 11/2004 | Jansen | 713/202 |
| 2007/0239730 A1 | 10/2007 | Vigelette et al. | |
| 2007/0271601 A1 | 11/2007 | Pomerantz | |
| 2007/0277224 A1 * | 11/2007 | Osborn et al. | 726/2 |
| 2008/0046997 A1 * | 2/2008 | Wang | 726/16 |
| 2008/0134317 A1 * | 6/2008 | Boss et al. | 726/18 |

(Continued)

*Primary Examiner* — Saleh Najjar
*Assistant Examiner* — Eric W Shepperd
(74) *Attorney, Agent, or Firm* — Womble Carlyle Sandridge & Rice LLP

(57) ABSTRACT

Some embodiments provide a method for authenticating a user to access computing resources that uses transient event data regarding previous interactions of the user with the computing resources. The method receives a notification that a user is unable to provide a correct user identifier and password. The method generates authentication questions for the remote user using the transient event data. The authentication questions are presented to the user. The method authenticates the user based on answers to the password recovery questions. The user may be a remote user and the computing resources are a set of application servers to which the user has forgotten a password. The computing resources may be a portable device that the user wishes to access remotely in order to delete data from the portable device.

27 Claims, 14 Drawing Sheets